(12) United States Patent (10) Patent No.: US 12,699,225 B2
Kuzuhara et al. (45) Date of Patent: Aug. 4, 2026

(54) OPTICAL SYSTEM AND IMAGE DISPLAY DEVICE

(71) Applicant: Panasonic Intellectual Property Management Co., Ltd., Osaka (JP)

(72) Inventors: Satoshi Kuzuhara, Osaka (JP); Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 333 days.

(21) Appl. No.: 18/531,891

(22) Filed: Dec. 7, 2023

(65) Prior Publication Data

US 2024/0103223 A1 Mar. 28, 2024

Related U.S. Application Data

(63) Continuation of application No. PCT/JP2022/017535, filed on Apr. 11, 2022.

(30) Foreign Application Priority Data

Jun. 9, 2021 (JP) ................................. 2021-096825

(51) Int. Cl.
G02B 6/26 (2006.01)
G02B 6/34 (2006.01)
G02B 27/01 (2006.01)
(52) U.S. Cl.
CPC .............. G02B 6/264 (2013.01); G02B 6/34 (2013.01); G02B 27/0172 (2013.01)
(58) Field of Classification Search
CPC ...... G02B 6/264; G02B 6/34; G02B 27/0172; G02B 27/0081; G02B 5/1809;
(Continued)

(56) References Cited

U.S. PATENT DOCUMENTS 10,429,645 B2 10/2019 Vallius
2011/0187964 A1* 8/2011 Li .......................... G02F 1/1335
362/624

(Continued)

FOREIGN PATENT DOCUMENTS

EP 3175280 6/2017
JP 2015-49376 3/2015
(Continued)

OTHER PUBLICATIONS

International Search Report issued Jun. 28, 2022 in International (PCT) Application No. PCT/JP2022/017535.
(Continued)

*Primary Examiner* — Thomas K Pham
*Assistant Examiner* — Justin W. Hustoft
(74) *Attorney, Agent, or Firm* — Wenderoth, Lind & Ponack, L.L.P.

(57) ABSTRACT

An optical system includes a light guide for guiding an image light ray which is output from a display element and forms an image, to a field of view region of a user as a virtual image. The light guide includes a body having a plate shape, and an in-coupling region and an exit region which are defined in the body. The in-coupling region is configured to allow the image light ray incident from the display element to propagate within the body. The exit region is configured to allow the image light ray propagating within the body to emerge from the body toward the field of view region. The in-coupling region includes a periodic structure constituted by recessed or protruded parts in relation to a thickness direction of the body which have periodicity in three directions intersecting each other within a plane perpendicular to the thickness direction of the body.

16 Claims, 15 Drawing Sheets

(58) Field of Classification Search

CPC .......... G02B 5/1866; G02B 2027/0174; G02B 5/0215; G02B 5/0247; G02B 5/0263; G02B 2005/1804; G02B 5/1819; G02B 5/1823; G02B 5/1828; G02B 5/1842; G02B 5/1871; G02B 26/04; G02B 27/0043; G02B 2027/0118; G02B 2027/0132; G02B 2027/0196; G02B 30/00; G02B 2027/0178; G02B 27/0012; G02B 27/0037; G02B 21/0004; G06T 19/006; G03H 1/2294; G03H 2223/19; G03H 2210/30; G03H 2001/2207; G03H 2225/23; G03H 2240/51; H04N 13/344; H04N 13/363; H04N 23/51; H04N 23/955; H04N 9/3147; C23C 16/042

USPC ........ 385/37, 129, 31, 15, 10; 359/599, 569, 359/615, 207.7; 216/56; 353/121, 28

See application file for complete search history.

(56) References Cited

U.S. PATENT DOCUMENTS

| | | |
|---|---|---|
| 2017/0102543 A1 | 4/2017 | Vallius |
| 2020/0110261 A1 | 4/2020 | Grey et al. |
| 2020/0209630 A1 | 7/2020 | Schultz et al. |
| 2021/0157148 A1 | 5/2021 | Lou et al. |
| 2024/0094456 A1 | 3/2024 | Schultz |

FOREIGN PATENT DOCUMENTS

| | | |
|---|---|---|
| JP | 2020-515884 | 5/2020 |
| JP | 2021-33252 | 3/2021 |
| WO | 2018/178626 | 10/2018 |
| WO | 2020/135634 | 7/2020 |
| WO | 2020/212647 | 10/2020 |

OTHER PUBLICATIONS

International Search Report issued Jun. 28, 2022 in International (PCT) Application No. PCT/JP2022/017533.

Extended European Search Report issued Aug. 9, 2024 in corresponding European Application No. 22819943.6.

Extended European Search Report issued Aug. 9, 2024 in corresponding European Application No. 22819944.4.

Bernard C. Kress et al., "Waveguide combiners for mixed reality headsets: a nanophotonics design perspective", Nanophotonics, vol. 10, No. 1, Oct. 7, 2020, pp. 41-74, XP055890328.

Choon How Gan et al., "Effects of polarisation and spatial coherence in the pupil expansion with crossed gratings in an AR display", SPIE Proceedings, vol. 11350, Mar. 30, 2020, pp. 1135002-1-1135002-8.

English language translation of International Preliminary Report on Patentability issued Nov. 21, 2023 in corresponding International (PCT) Patent Application No. PCT/JP2022/017533.

English language translation of International Preliminary Report on Patentability issued Nov. 21, 2023 in corresponding International (PCT) Patent Application No. PCT/JP2022/017535.

Office Action dated Jan. 22, 2026 in U.S. Appl. No. 18/532,148.

Communication pursuant to Article 94(3) EPC dated Feb. 23, 2026 in European Patent Application No. 22819943.6.

Communication pursuant to Article 94(3) EPC dated Feb. 23, 2026 in European Patent Application No. 22819944.4.

Notice of Allowance issued May 26, 2026 in U.S. Appl. No. 18/532,148.

\* cited by examiner

OPTICAL SYSTEM AND IMAGE DISPLAY DEVICE

CROSS-REFERENCE TO RELATED APPLICATIONS

The present application is a continuation of PCT/JP2022/017535 filed on Apr. 11, 2022, which claims priority to Japanese Patent Application No. 2021-096825 filed on Jun. 9, 2021, the entire contents of which are incorporated herein by reference.

TECHNICAL FIELD

The present disclosure relates to optical systems and image display devices.

BACKGROUND ART

US 10429645 B discloses an optical element (optical system) including a waveguide (light guide) for expanding an exit pupil in two directions. The optical element includes three diffractive optical elements (DOEs). The first DOE is configured to couple a beam from an imager into the waveguide. The second DOE expands the exit pupil in a first direction along a first coordinate axis. The third DOE expands the exit pupil in a second direction along a second coordinate axis and couples light out of the waveguide.

US 2020/0209630 A1 discloses a waveguide including a surface provided with an in-coupling diffractive optic and an out-coupling diffractive optic. The out-coupling diffractive optic includes a diffractive array having rows with different grating vectors are arranged alternately and therefore has multiple grating vectors which are not parallel to the grating vector of the in-coupling diffractive optic.

SUMMARY OF INVENTION

Technical Problem

The techniques disclosed in U.S. Pat. No. 10,429,645 B and US 2020/0209630 A1 are used for head mounted displays, for example. Regarding the head mounted displays, there is demand for improving a use efficiency of light (image light rays) forming an image from a display element. The present disclosure provides an optical system and an image display device capable of improving a use efficiency of an image light ray from a display element.

Solution to Problem

An optical system according to one aspect of the present disclosure includes a light guide for guiding an image light ray which is output from a display element and forms an image, to a field of view region of a user as a virtual image, the light guide including a body having a plate shape, and an in-coupling region and an exit region which are formed in the body, the in-coupling region allowing the image light ray incident from the display element to propagate within the body, the exit region allowing the image light ray propagating within the body to emerge from the body toward the field of view region, and the in-coupling region including a periodic structure constituted by recessed or protruded parts in relation to a thickness direction of the body which are arranged to have periodicity in three predetermined directions intersecting each other within a predetermined plane perpendicular to the thickness direction of the body.

An image display device according to one aspect of the present disclosure includes the above optical system and the display element.

Advantageous Effects of Invention

Aspects of the present disclosure enables improvement of use efficiency of an image light ray from a display element.

DESCRIPTION OF EMBODIMENTS

Hereinafter, embodiments will be described in detail with reference to appropriate drawings. Note that, description more detailed than necessary will be omitted. For example, detailed description of well-known matters or duplicate description of substantially the same components may be omitted. This aims to avoid the following description from becoming more redundant than necessary and to facilitate understanding of persons skilled in the art. The inventor(s) provides the following description and attached drawings for making persons skilled in the art understand the present disclosure only and has no intention to limit subject matters claimed in claims.

1. Embodiments

1.1 Outline

Figure 1:
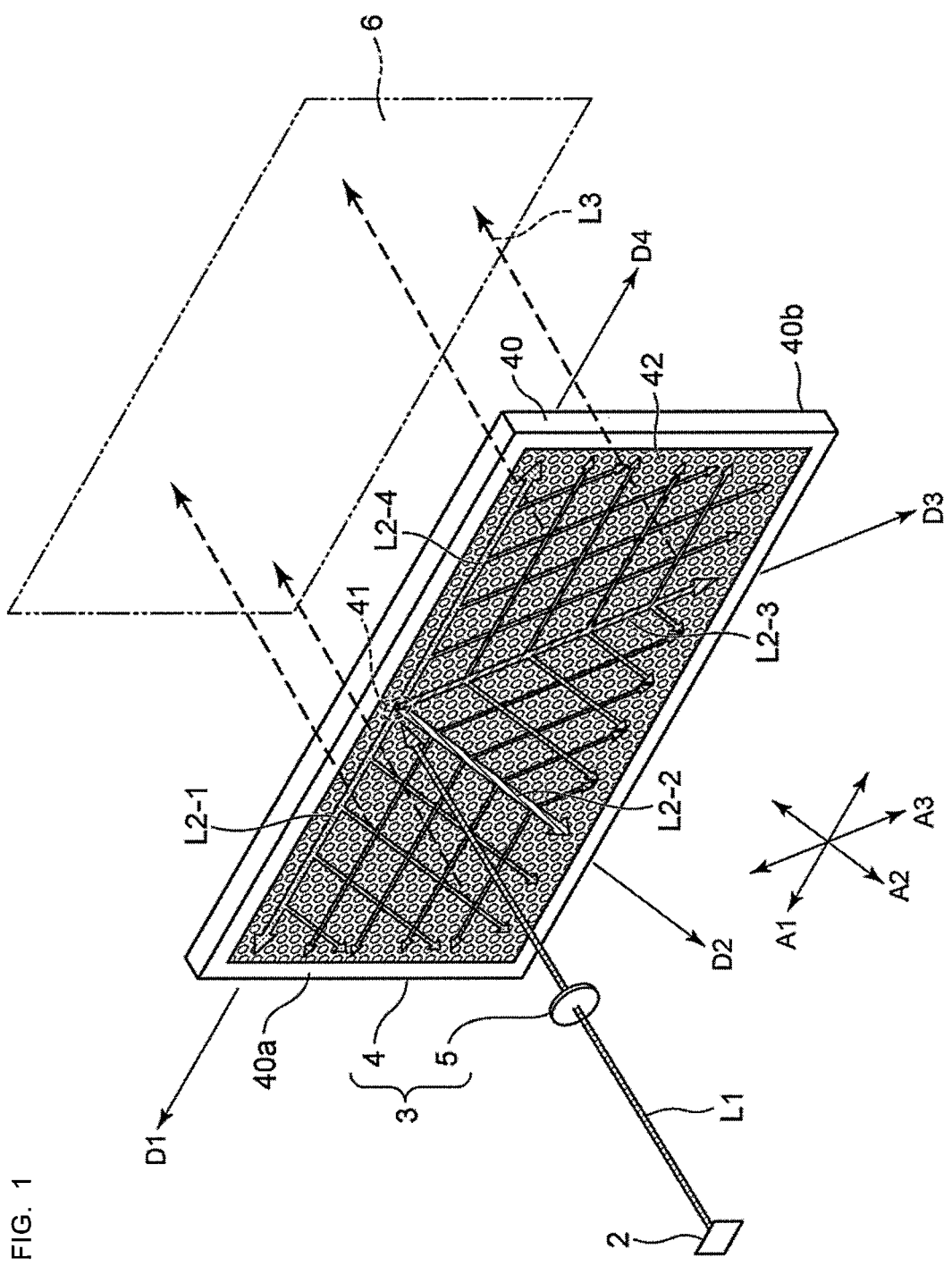
FIG. 1 is a schematic view of a configuration example of an image display device including an optical system according to one embodiment.

FIG. 1 is a schematic view of a configuration example of an image display device 1 according to one embodiment. The image display device 1 is, for example, a head mounted display (HMD) which is mounted on a user's head and displays an image (picture). In the present disclosure, a "direction of _axis" means a direction which passes an arbitrary point and is parallel to the _axis. In the present disclosure, expressions "travel in direction" and "propagate in _direction" used in relation to light rays mean that a light ray corresponding to a center of an image or a light ray forming an image travels in the direction as a whole and therefore light beams included in the light ray forming the image may be permitted to be inclined relative to the _direction. For example, regarding a "light ray traveling in _direction", it is sufficient that a main light beam of this light is directed in the direction, and auxiliary beams of this light may be inclined relative to the direction.

As shown in FIG. 1, the image display device 1 includes a display element 2 and an optical system 3. The display element 2 is configured to output an image light ray L1 forming an image. The optical system 3 includes a light guide 4 and a projection optical system 5. The light guide 4 guides the image light ray L1 output from the display element 2 to a field of view region 6 of a user as a virtual image. The light guide 4 includes a body 40 having a plate shape, and an in-coupling region 41 and an exit region 42 which are formed in the body 40. The in-coupling region 41 allows the image light ray L1 incident from the display element 2 to propagate within the body 40. The exit region 42 allows the image light ray L1 propagating within the body 40 to emerge from the body 40 toward the field of view region 6. Herein, only for simplifying FIG. 1, the image light ray L1 is depicted as light with directivity. However, actually, the image light ray L1 is incident on the light guide 4 as light having an angle corresponding to a field of view.

Figure 2:
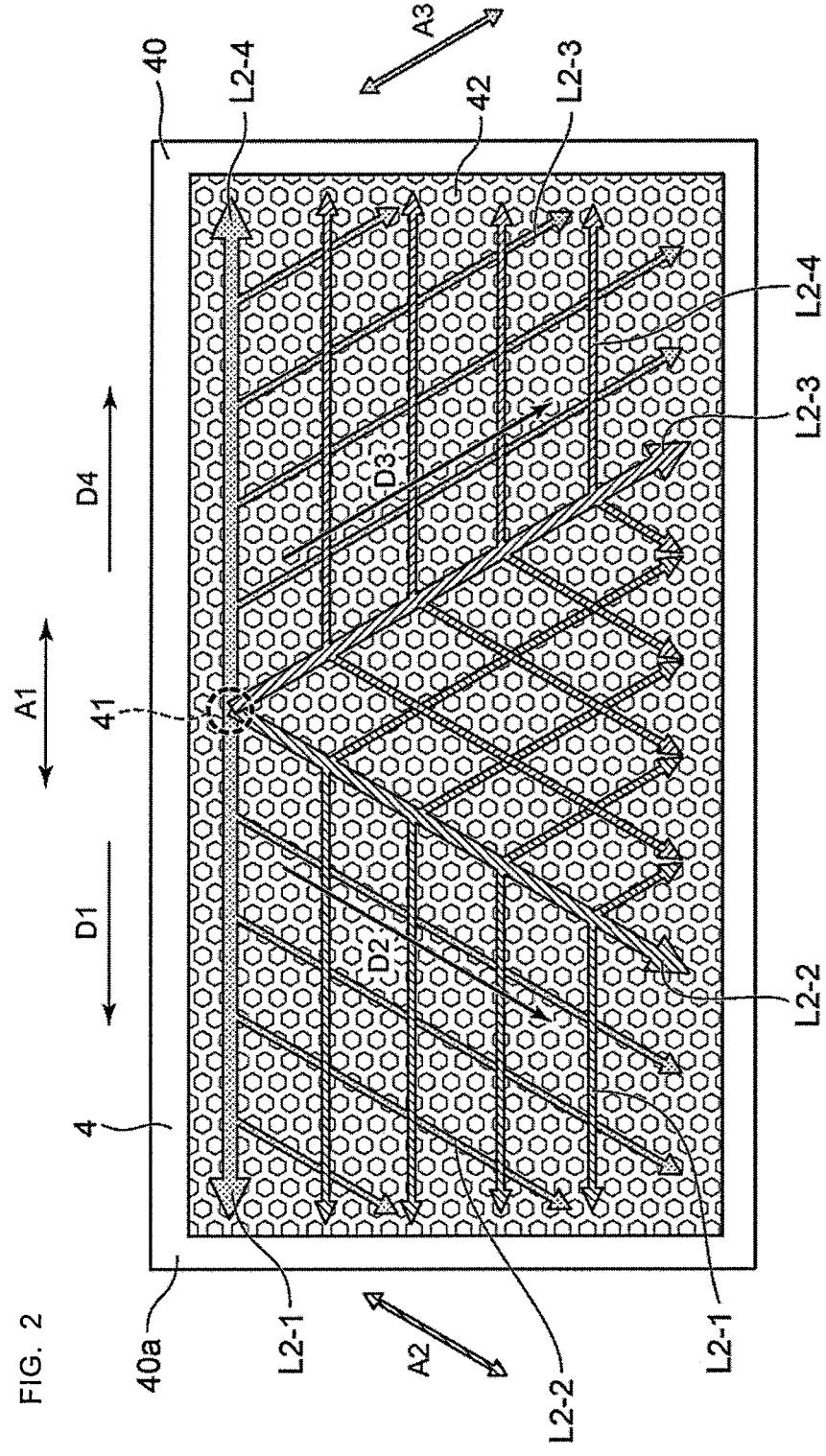
FIG. 2 is a schematic plan view of a configuration example of a light guide of the optical system of FIG. 1.
Figures 3, 4:
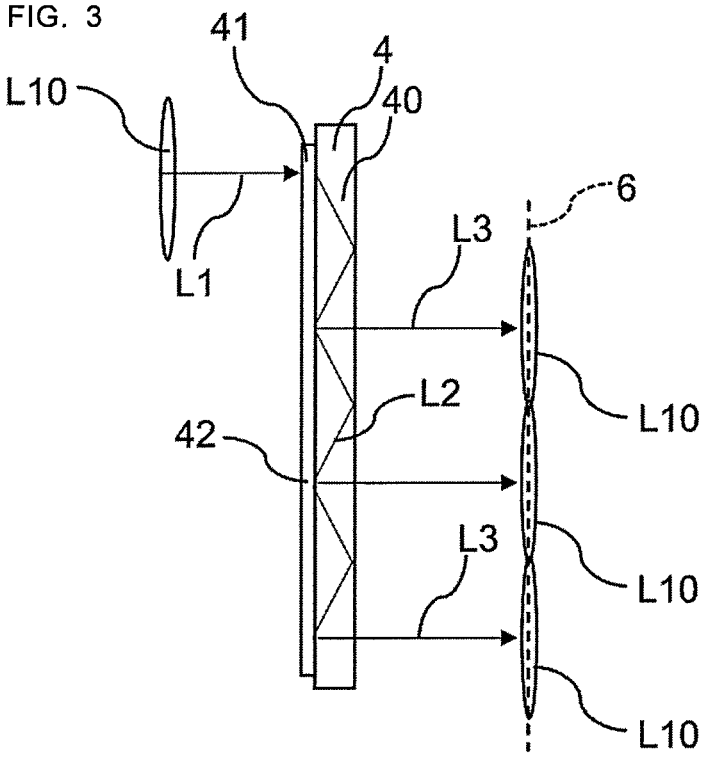
FIG. 3 is a schematic side view of the configuration example of the light guide of the optical system of FIG. 1.
FIG. 4 is a plan view of a configuration example of a periodic structure of the light guide of FIG. 2.

FIG. 2 is a schematic plan view of a configuration example of the light guide 4, and FIG. 3 is a schematic side view of the configuration example of the light guide 4. In FIG. 3, to show a function of pupil expansion of the image display device 1 in an understandable manner, a pupil L10 is depicted instead of the display element 2 and the projection optical system 5.

As shown in FIG. 2, in the light guide 4, the in-coupling region 41 and the exit region 42 each include a periodic structure.

Figure 5:
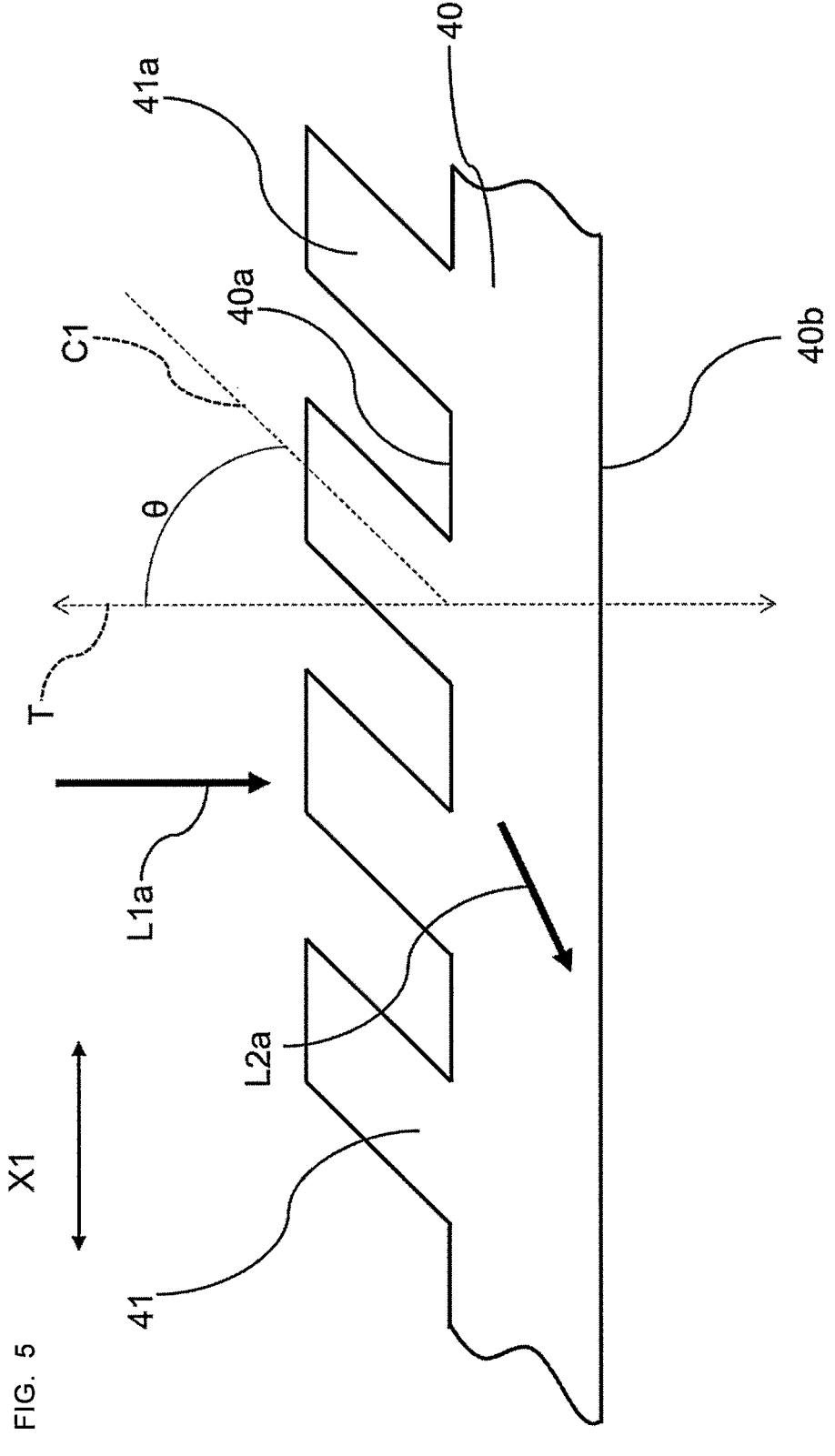
FIG. 5 is a sectional view of the configuration example of the periodic structure of the light guide of FIG. 2.

FIG. 4 is a plan view of a configuration example of the periodic structure of the in-coupling region 41. FIG. 5 is a sectional view of the configuration example of the periodic structure of the in-coupling region 41. As shown in FIG. 4, the periodic structure is constituted by recessed or protruded parts 41*a* arranged to have periodicity in three predetermined directions A1, A2, A3 intersecting each other in a predetermined plane perpendicular to a thickness direction T of the body 40. FIG. 5 shows behavior that the image light ray L1*a* is incident on the in-coupling region 41 and then due to diffraction effect by the periodic structure causes an image light ray L2*a* propagating within the body 40. As shown in FIG. 5, an central axis C1 of the recessed or protruded part 41*a* is inclined relative to the thickness direction (an upward/downward direction in FIG. 5) T of the body 40.

As described above, in the light guide 4, each of the in-coupling region 41 and the exit region 42 includes the periodic structure, and the periodic structure has periodicity in the three predetermined directions A1 A2, A3 intersecting each other in the predetermined plane perpendicular to the thickness direction T of the body 40. Therefore, in the light guide 4, the in-coupling region 41 divides the image light ray L1 into a plurality of image light rays and allows the plurality of image light rays to propagate within the body 40 in a plurality of branch directions including the first, second, third, and fourth branch directions D1, D2, D3, D4 respectively parallel to the three predetermined directions A1, A2, A3, and the exit region 42 allows the image light rays L2-1 to L2-4 propagating within the body 40 in the plurality of branch directions to emerge from the body 40 toward the field of view region 6. As described above, the light guide 4 reproduces a pupil of the image right ray L1 to expand the pupil by: dividing the image light ray L1 into a plurality of the image light rays in the plurality of branch directions D1 to D4; further dividing the plurality of image light rays into a plurality of the image light rays L3 parallel to each other; and allowing the plurality of image light rays L3 to emerge toward the field of view region 6. In the periodic structure, the central axes C1 of the recessed or protruded parts 41*a* are inclined relative to the thickness direction T of the body 40. This enables controlling a diffraction efficiency of light in the predetermined plane perpendicular to the thickness direction T of the body 40. For example, adjusting directions and angles of inclining the central axes C1 of the recessed or protruded parts 41*a* relative to the thickness direction T of the body 40 enables a decrease in an amount of light propagating in a direction in which light diffraction is not required and an increase in an amount of light propagating in a direction in which light diffraction is required. Consequently, it is possible to guide the image light ray L1 from the display element 2 toward the field of view region 6 efficiently. Accordingly, the use efficiency of the image light ray from the display element can be improved.

1.2 Details

Hereinafter, the image display device 1 according to the present embodiment will be described in detail with reference to FIG. 1 to FIG. 12. As shown in FIG. 1, the image display device 1 includes the display element 2 and the optical system 3.

The display element 2 is configured to, in order to display an image (picture), output the image light ray L1 for forming the image. The image light ray L1 includes light beams output from respective points of the display element 2. The respective points of the display element 2 correspond to respective pixels of the display element 2, for example. The optical axis of the image light ray L1 is an optical axis of a light ray output from a center of the display element 2, for example. Examples of the display element 2 may include known displays such as liquid crystal displays, organic EL displays, scanning MEMS mirrors, or the like.

As shown in FIG. 1, the optical system 3 is configured to guide the image light ray L1 output from the display element 2 toward the field of view region 6 set relative to eyes of the user. Within the field of view region 6, the user can watch by his or her own eyes the image formed by the display element 2 with the image not being interrupted. Especially, in the present embodiment, the optical system 3 expands the field of view region 6 by utilizing effects of pupil expansion.

As shown in FIG. 1, the optical system 3 includes the light guide 4 and the projection optical system 5.

The light guide 4 is configured to guide the image light ray L1 which is output from the display element 2 and forms the image, toward the field of view region 6 as a virtual image. The light guide 4 includes the body 40 having a plate shape, and the in-coupling region 41 and the exit region 42 which are formed in the body 40.

The body 40 is made of transparent material and includes a first surface 40a and a second surface 40b in the thickness direction T thereof. In the present embodiment, the body 40 has a rectangular plate shape. As shown in FIG. 1, the body 40 is positioned or arranged to direct the first surface 40a toward the display element 2 and direct the second surface 40b toward the field of view region 6. In the present embodiment, the first surface 40a includes a surface on which the image light ray L1 is incident, in the body 40. In the present embodiment, the second surface 40b includes a surface from which the image light ray L1 emerges, in the body 40.

The in-coupling region 41 allows the image light ray L1 incident from the display element 2 to propagate within the body 40. The in-coupling region 41 is a region on which the image light ray L1 from the display element 2 is incident, in the light guide 4. The in-coupling region 41 is used for coupling between the display element 2 and the light guide 4. The in-coupling region 41 allows external light ray (the image light ray L1) to be incident on the light guide 4 and propagate within the body 40 of the light guide 4 under a total reflection condition (see FIG. 3). The term "coupling" used herein means allowing propagation inside the body 40 of the light guide 4 under a total reflection condition.

The in-coupling region 41 is formed in the first surface 40a of the body 40. That is, the in-coupling region 41 is on a surface (the first surface 40a) on which the image light ray L1 is incident, in the body 40. The in-coupling region 41 is located inside a predetermined rectangular region of the first surface 40a of the body 40 and is located at one end in a width direction of the rectangular region and at a center in a length direction of the rectangular region. As shown in FIG. 2, the in-coupling region 41 is a diffraction grating having periodicity in the three predetermined directions A1, A2, A3 intersecting each other in the predetermined plane perpendicular to the thickness direction T of the body 40. In the present embodiment, the three predetermined directions A1, A2, A3 are not perpendicular to each other. Since the in-coupling region 41 is formed in the first surface 40a which is a surface facing the display element 2, of the body 40 (the surface on which the image light ray L1 is incident), the in-coupling region 41 is a transmission diffraction grating. In FIG. 2, the predetermined direction A1 corresponding to a length direction of the body 40. Based on a counterclockwise direction of FIG. 2, the predetermined direction A2 intersects the predetermined direction A1 at a predetermined angle (e.g., 60 degrees) and the predetermined direction A3 intersects the predetermined direction A1 at a different predetermined angle (e.g., 120 degrees).

In more detail, the in-coupling region 41 includes the periodic structure constituted by the recessed or protruded parts 41a in relation to the thickness direction T of the body 40 which are arranged within the predetermined plane to have periodicity in the three predetermined directions A1, A2, A3. As shown in FIG. 4, the recessed or protruded parts 41a are arranged to satisfy following conditions (1) to (3). The condition (1) specifies that in the predetermined direction A1, rows of the recessed or protruded parts 41a arranged in a direction X1 perpendicular to the predetermined direction A1 are arranged at a regular interval. Satisfying the condition (1) allows the periodic structure to function as a diffraction grating for diffracting light into the predetermined direction A1. The condition (2) specifies that in the predetermined direction A2, rows of the recessed or protruded parts 41a arranged in a direction X2 perpendicular to the predetermined direction A2 are arranged at a regular interval. Satisfying the condition (2) allows the periodic structure to function as a diffraction grating for diffracting light into the predetermined direction A2. The condition (3) specifies that in the predetermined direction A3, rows of the recessed or protruded parts 41a arranged in a direction X3 perpendicular to the predetermined direction A3 are arranged at a regular interval. Satisfying the condition (3) allows the periodic structure to function as a diffraction grating for diffracting light into the predetermined direction A3. In the present embodiment, the recessed or protruded parts 41a are arranged in a hexagonal lattice, thereby satisfying the conditions (1) to (3). In the present embodiment, each recessed or protruded part 41a is a protrusion with a hexagonal shape in its plan view.

As described above, the in-coupling region 41 has periodicity in the three predetermined directions A1, A2, A3. Accordingly, the in-coupling region 41 divides the image light ray L1 incident from the display element 2 into a plurality of image light rays and allows the plurality of image light rays to propagate within the body 40 in a plurality of branch directions. The plurality of branch directions include the first, second, and third branch directions D1, D2, D3 respectively parallel to the three predetermined directions A1, A2, A3. An angle between the first branch direction D1 and the third branch direction D3 is larger than an angle between the first branch direction D1 and the second branch direction D2. The plurality of branch directions further include a fourth branch direction D4. The fourth branch direction D4 is an opposite direction from the first branch direction D1. An angle between the first branch direction D1 and the fourth branch direction D4 is larger than the angle between the first branch direction D1 and the third branch direction D3. Concretely, the angle between the first branch direction D1 and the second branch direction D2 is 60 degrees, the angle between the first branch direction D1 and the third branch direction D3 is 120 degrees, and the angle between the first branch direction D1 and the fourth branch direction D4 is 180 degrees. The angles herein are defined so that a counterclockwise direction when the light guide 4 is viewed in a direction where the image light ray L1 is incident on the light guide 4 is a positive direction.

The in-coupling region 41 uses diffraction to allow the image light ray L1 to be incident on the body 40 of the light guide 4 to meet a condition where it is totally reflected by the first surface 40a and the second surface 40b.

The in-coupling region 41 allows the image light ray L1 to travel in each of the plurality of branch directions D1 to D4 within the body 40 of the light guide 4 while being totally reflected by the first surface 40a and the second surface 40b. As described above, the in-coupling region 41 allows image light rays L2-1 to L2-4 propagating within the body 40 in the plurality of branch directions D1 to D4 respectively to branch off from the image light ray L1. In other words, as shown in FIG. 2, the in-coupling region 42 divides the image light ray L1 into the image light rays L2-1 to L2-4 propagating within the body 40 in the plurality of branch directions D1 to D4 respectively.

In the present embodiment, since the in-coupling region 41 has periodicity in the three predetermined directions A1, A2, A3, the plurality of branch directions further include fifth and sixth branch directions. The fifth and sixth branch directions are opposite directions from the second and third branch directions D2, D3, respectively. The structure of the light guide 4 does not allow large amounts of image light rays propagating in the fifth and sixth branch direction to emerge from the exit region 42 toward the field of view region 6, and therefore these are waste. Therefore, by decreasing an amount of light propagating in a direction in which light diffraction is not required, such as the fifth and sixth branch directions and increasing an amount of light propagating in a direction in which light diffraction is required, such as the third and fourth branch directions, it is possible to improve the use efficiency of the image light ray L1 from the display element 2.

From this point of view, in the present embodiment, as shown in FIG. 5, the central axis C1 of the recessed or protruded part 41a is inclined relative to the thickness direction (the upward/downward direction in FIG. 5) T of the body 40. The central axis C1 is an axis passing through a center of the recessed or protruded part 41a in a plan view thereof. The direction of the central axis C1 determines an inclination of the recessed or protruded part 41a relative to the body 40 in an arbitrary plane including the thickness direction of the body 40. In the in-coupling region 41, by inclining the central axis C1 of the recessed or protruded part 41a relative to the thickness direction T of the body 40, it is possible to control a light diffraction efficiency in the predetermined plane perpendicular to the thickness direction T of the body 40. In FIG. 5, the central axis C1 of the recessed or protruded part 41a is inclined in a direction X1 perpendicular to the predetermined direction A1. Thus, the central axis C1 of the recessed or protruded part 41a is inclined relative to the thickness direction T of the body 40 in a plane including the second branch direction D2 and the thickness direction T of the body 40 and in a plane including the third branch direction D3 and the thickness direction T of the body 40. In FIG. 5, the central axis C1 of the recessed or protruded parts 41a is inclined in an opposite direction from the second branch direction D2 relative to a direction (an upward direction in FIG. 5) of the surface (the first surface 40a) on which the image light ray L1 is incident in the body 40, in the plane including the second branch direction D2 and the thickness direction T of the body 40, and is inclined in an opposite direction from the third branch direction D3 relative to the direction (an upward direction in FIG. 5) of the surface (the first surface 40a) on which the image light ray L1 is incident in the body 40, in the plane including the third branch direction and the thickness direction T of the body 40. In summary, the central axis C1 of the recessed or protruded part 41a is inclined in an opposite direction from the second branch direction D2 and the third branch direction D3 relative to the first surface 40a of the body 40. Owing to this, it becomes easy for the in-coupling region 41 to allow the image light ray L1a incident on the recessed or protruded part 41a to propagate within the body 40 as the image light ray L2a traveling in the second branch direction D2 or the third branch direction D3. Thus, it is possible to decrease diffraction of the image light ray L1a in the opposite direction from the second branch direction D2 or the third branch direction D3 and therefore the image light ray L1a is allowed to propagate toward the field of view region 6 of the user efficiently. In this regard, side surfaces of the recessed or protruded part 41a of FIG. 5 are inclined with being parallel to each other. However, the structure of the recessed or protruded part 41a is not limited thereto, but may be a tapered structure in which a grating width becomes smaller as further from the first surface 40a or stepwise (multilevel) structure.

Figure 6:
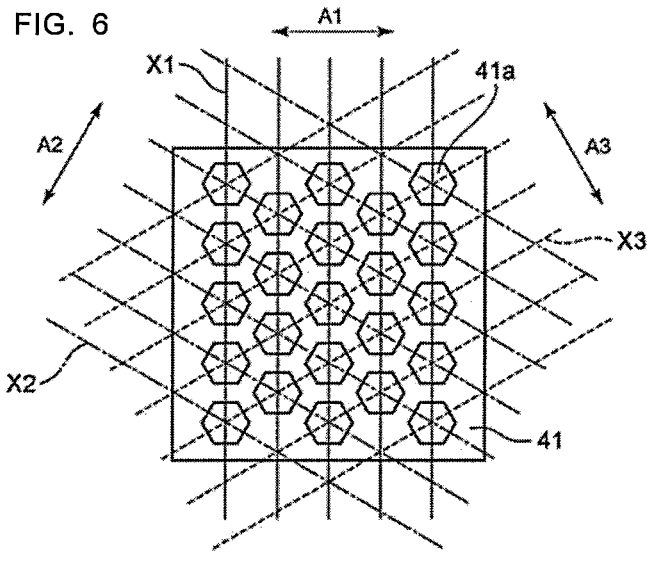
FIG. 6 is a plan view of a comparative example of the periodic structure of the light guide of FIG. 2.
Figure 7:
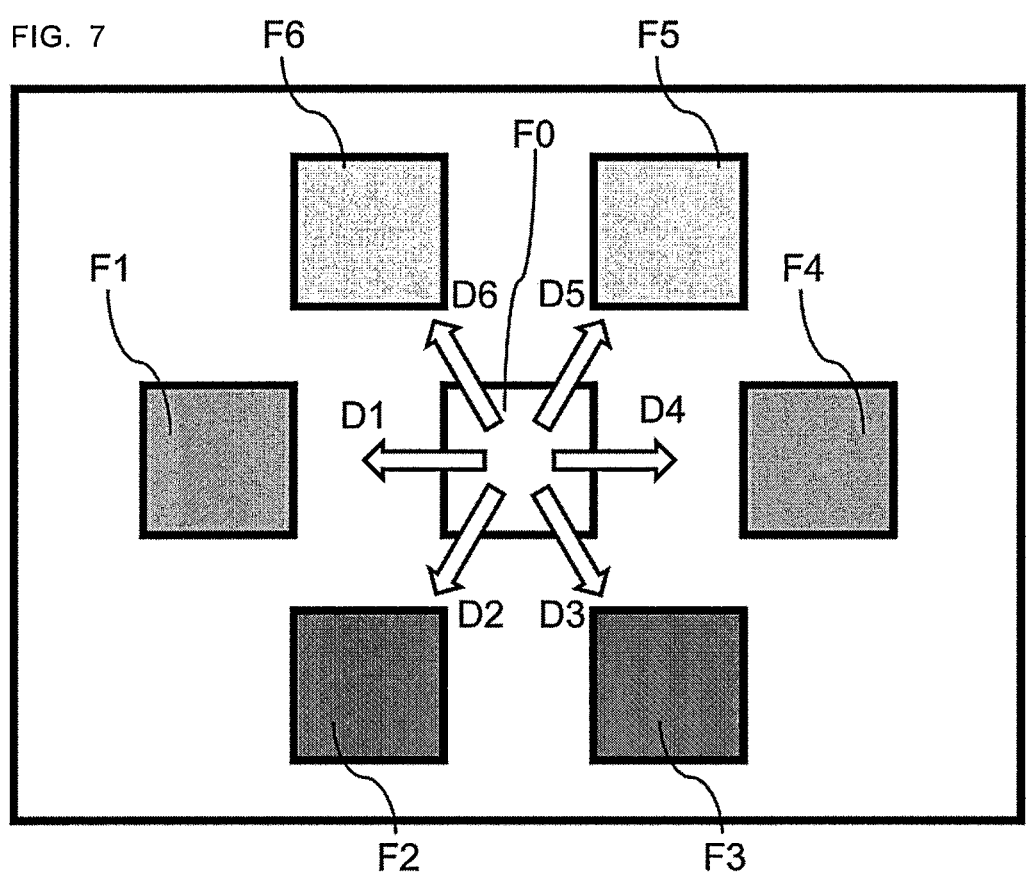
FIG. 7 is a diagram for illustration of a result of a simulation regarding a light diffraction efficiency of the periodic structure of FIG. 4.
Figure 8:
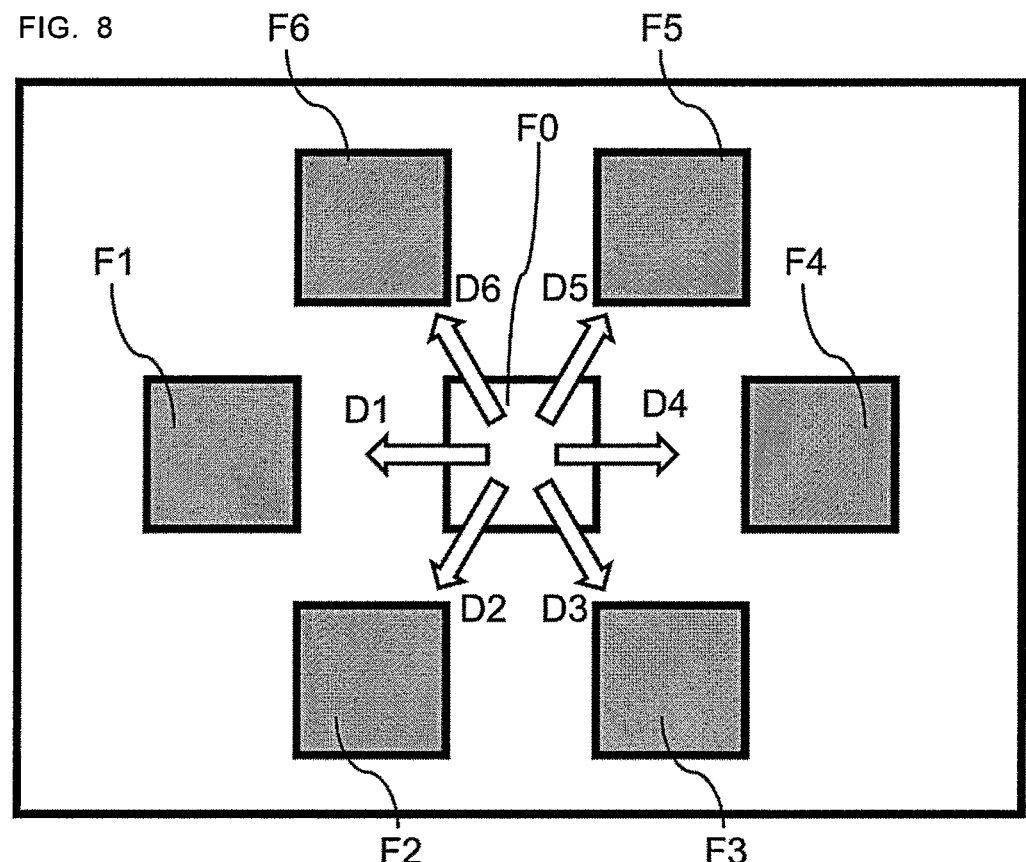
FIG. 8 is a diagram for illustration of a result of a simulation regarding a light diffraction efficiency of the periodic structure of FIG. 6.

FIG. 6 is a plan view of a comparison example of the periodic structure of the in-coupling region 41. In the comparison example of FIG. 6, the central axis of the recessed or protruded parts 41a is not inclined relative to the thickness direction of the body 40. To confirm differences between the periodic structure including the recessed or protruded parts 41a shown in FIG. 4 and the periodic structure including the recessed or protruded parts 41a shown in FIG. 6, simulations for a light diffraction efficiency were performed. FIG. 7 is a diagram for illustration of a result of a simulation regarding a light diffraction efficiency of the periodic structure of FIG. 4. FIG. 8 is a diagram for illustration of a result of a simulation regarding a light diffraction efficiency of the periodic structure of FIG. 6. In FIGS. 7, 8, an efficiency F0 represents a zero-order diffraction efficiency when the image light ray L1 is incident on the periodic structure. Efficiencies F1 to F6 represent respective diffraction efficiencies for propagation in the first to sixth branch directions D1 to D6 when the image light ray L1 is incident on the periodic structure. In the simulations of FIG. 7, 8, a darker color means that the efficiencies F0 to F6 are larger, and a lighter color means that the efficiencies F0 to F6 are smaller. As apparent from FIG. 8, in the periodic structure including the recessed or protruded parts 41a shown in FIG. 6, the efficiencies F1 to F6 are almost equal to each other. In contrast, as apparent from FIG. 7, in the periodic structure including the recessed or protruded parts 41a shown in FIG. 4, the efficiencies F5, F6 decrease and instead the efficiencies F2, F3 increase. Therefore, by employing the periodic structure including the recessed or protruded parts 41a shown in FIG. 4, in comparison to the periodic structure including the recessed or protruded parts 41a shown in FIG. 6, it is possible to decrease an amount of light propagating in a direction in which light diffraction is not required, such as the fifth and sixth branch directions, and to increase an amount of light propagating in a direction in which light diffraction is required, such as the third and fourth branch directions. This enables improvement of the use efficiency of the image light ray L1 from the display element 2.

The inclined angle θ of the central axis C1 of the recessed or protruded part 41a relative to the thickness direction (the upward/downward direction in FIG. 5) T of the body 40 is set to be larger than 20 degrees and smaller than 65 degrees, for example.

The exit region 42 allows the image light ray L1 propagating within the body 40 to emerge from the body 40 toward the field of view region 6. The exit region 42 allows the plurality of image light rays L2-1 to L2-4 propagating within the body 40 in the plurality of branch directions D1 to D4 to emerge from the body 40 toward the field of view region 6. In more detail, the exit region 42 allows the image light ray L2 from the in-coupling region 41 to propagate in its branch direction and allows part of the image light ray L2 to emerge from the light guide 4 toward the field of view region 6.

The exit region 42 is formed in the first surface 40$a$ of the body 40. Especially, the exit region 42 is located inside the predetermined rectangular region of the first surface 40$a$ of the body 40 and is located at part excluding the in-coupling region 41. In the present embodiment, the exit region 42 is located inside the predetermined rectangular region of the first surface 40$a$ of the body 40 and is located at one end in a width direction of the rectangular region and at a center in a length direction of the rectangular region. As shown in FIG. 2, the exit region 42 is a diffraction grating having periodicity in the three predetermined directions A1, A2, A3 intersecting each other in the predetermined plane perpendicular to the thickness direction T of the body 40. Since the exit region 42 is formed in the first surface 40$a$ which is an opposite surface from the field of view region 6 in the body 40 (the surface on which the image light ray L1 is incident), the in-coupling region 41 is a reflection diffraction grating. In the present embodiment, the exit region 42 has the same structure as the in-coupling region 41. Therefore, the periods of the in-coupling region 41 and the exit region 42 are constant and are identical to each other.

As described above, the exit region 42 has periodicity in the three predetermined directions A1, A2, A3. Therefore, the exit region 42 allows part of the image light ray L2 from the in-coupling region 41 to branch off in a branch direction different from a branch direction corresponding to the image light ray L2. FIG. 2 indicates that a plurality of image light rays L2-2 traveling in the second branch direction D2 branch off from the image light ray L2-1 traveling in the first branch direction D1 from the in-coupling region 41, as one example. FIG. 2 indicates that a plurality of image light rays L2-1, L2-3 traveling in the first and third branch directions D1, D3 branch off from the image light ray L2-2 traveling in the second branch direction D2 from the in-coupling region 41, as one example. FIG. 2 indicates that a plurality of image light rays L2-2, L2-4 traveling in the second and fourth branch directions D2, D4 branch off from the image light ray L2-3 traveling in the third branch direction D3 from the in-coupling region 41, as one example. FIG. 2 indicates that a plurality of image light rays L2-3 traveling in the third branch direction D3 branch off from the image light ray L2-4 traveling in the fourth branch direction D4 from the in-coupling region 41, as one example.

As described above, by the in-coupling region 41 and the exit region 42, the image light ray L1 is divided within the body 40 into the plurality of image light rays L2-1 to L2-4 traveling respectively in the plurality of branch directions D1 to D4 and thus spreads within the predetermined plane perpendicular to the thickness direction of the body 40. Each of the plurality of image light rays L2-1 to L2-4 traveling respectively in the plurality of branch directions D1 to D4 is divided into a plurality of mutually parallel image light rays L3 (see FIG. 3) and thereby emerges from the body 40 toward the field of view region 6.

The exit region 42 has the same structure as the in-coupling region 41. Therefore, as shown in FIG. 5, the central axis C1 of the recessed or protruded part 41$a$ is inclined relative to the thickness direction (the upward/ downward direction in FIG. 5) T of the body 40. Accordingly, in comparison to the periodic structure including the recessed or protruded parts 41$a$ shown in FIG. 6, it is possible to decrease an amount of light propagating in a direction in which light diffraction is not required, such as the fifth and sixth branch directions, and to increase an amount of light propagating in a direction in which light diffraction is required, such as the third and fourth branch directions. This enables improvement of the use efficiency of the image light ray L1 from the display element 2.

In the present embodiment, the in-coupling region 41 and the exit region 42 both are the periodic structures having periodicity in the three predetermined directions A1, A2, A3 intersecting each other in the predetermined plane perpendicular to the thickness direction T of the body 40. Therefore, part of the periodic structure formed inside the predetermined rectangular region of the first surface 40$a$ of the body 40 functions as the in-coupling region 41 and the remaining part functions as the exit region 42.

In the light guide 4, individual wave vectors in the plurality of branch directions of the periodic structures of the in-coupling region 41 and the exit region 42 are set as follows. The individual wave vectors in the first, second, third and fourth branch directions D1, D2, D3, D4 of the periodic structures of the in-coupling region 41 and the exit region 42 are denoted by k1, k2, k3, k4. In the present embodiment, an n-th (n is integer equal to or greater than 3) branch direction is set so that an angle between the first branch direction and the n-th branch direction is larger than an angle between the first branch direction and an (n−1)th branch direction. The angles herein are defined so that a counterclockwise direction when the light guide 4 is viewed in a direction where the image light ray L1 is incident on the light guide 4 is a positive direction. For example, components of the wave vector are set based on an x-y plane defined by an x axis a direction of which is specified by the predetermined direction A1 and a y axis specified by a direction perpendicular to the predetermined direction A1 within the predetermined plane. In this regard, a center of the in-coupling region 421 may be selected as an origin of the x-y plane.

In the optical system 3, when the wave vectors in the first, second, and third branch directions D1, D2, D3 of the periodic structures of the in-coupling region 41 and the exit region 42 are denoted by k1, k2, k3, respectively, and a maximum value of absolute values of the wave vectors k1, k2, k3 in the first, second, and third branch directions D1, D2, D3 is denoted by km, the wave vectors k1, k2, k3 satisfy a relation of $|k1−k2+k3|<km/5$, preferably. $|k1−k2+k3|$ means an absolute value of a resultant vector represented by $k1−k2+k3$. In this regard, it is possible to reduce chromatic aberration of the image light ray L3 reaching the field of view region 6 of the user. This enables improvement of image quality. It is more preferable that the wave vectors k1, k2, k3 satisfy $|k1−k2+k3|<km/10$. In this case, even if a wavelength range of the image light ray L1 has a width of about ±2 nm, chromatic aberration perceived by the user can be reduced to about 1 minute of arc. This enables further improvement of image quality. It is more preferable that the wave vectors k1, k2, k3 satisfy $−k2+k3|<km/50$. In this case, even if a wavelength range of the image light ray L1 has a width of about ±10 nm, chromatic aberration perceived by the user can be reduced to about 1 minute of arc. This enables further improvement of image quality. It is more preferable that the wave vectors k1, k2, k3 satisfy $−k2+k3|=0$. In this case, an angle of the image light ray L1 incident on the in-coupling region 41 is identical to an angle of the image light ray L3 emerging from the exit region 42 toward the field of view region 6. It is possible to keep the angle of the image light ray L1 unchanged. This enables further improvement of image quality.

Figure 9:
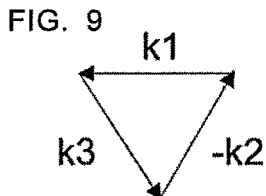
FIG. 9 is an explanatory view of wave vectors of the periodic structure of the light guide of FIG. 2.
Figure 10:
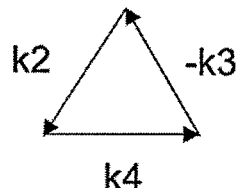
FIG. 10 is an explanatory view of wave vectors of the periodic structure of the light guide of FIG. 2.
Figure 11:
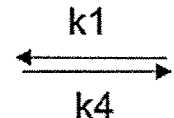
FIG. 11 is an explanatory view of wave vectors of the periodic structure of the light guide of FIG. 2.

In the present embodiment, as shown in FIG. 9, the wave vectors k1, k2, k3 satisfy a relation of $|k1-k2+k3|=0$. The relation of $|k1-k2+k3|=0$ should not be interpreted in strict sense but may permit that k1−k2+k3 is regarded as 0. As shown in FIG. 10, the wave vectors k2, k3, k4 satisfy a relation of $|k4+k2-k3|=0$. $|k4+k2-k3|$ is an absolute value of a resultant vector represented by k4+k2−k3. The relation of $|k4+k2-k3|=0$ should not be interpreted in strict sense but may pen lit that k4+k2−k3 is regarded as 0. As shown in FIG. 11, the wave vectors k1, k4 satisfy a relation of $|k1+k4|=0$. $|k1+k4|$ is an absolute value of a resultant vector represented by k1+k4. The relation of $|k1+k4|=0$ should not be interpreted in strict sense but may permit that k1+k4 is regarded as 0. In the present embodiment, the individual absolute values of the wave vectors k1, k2, k3, and k4 are identical to each other. Further, the individual absolute values of the wave vectors k4, k2, and k3 are identical to each other. Therefore, in the case where the image light ray L1 is incident on the in-coupling region 41 along the thickness direction T of the body 40, it is possible to arrange the pupils L10 of the image light ray L1 at a regular interval in the field of view region 6. Especially, as shown in FIG. 3, in the case where the image light ray L1 is incident on the in-coupling region 41 along the thickness direction T of the body 40, it is possible to arrange the pupils L10 of the image light ray L1 to reduce an area of the field of view region 6 where no pupil L10 is located.

As shown in FIG. 3, the aforementioned light guide 4 reproduces the pupil L10 of the image right ray L1 to expand the pupil L10 by: dividing the image light ray L1 entering the body 40 from the in-coupling region 41 within the body 40 into the plurality of image light rays L2 propagating in the plurality of branch direction; and further dividing the plurality of image light rays L2 propagating in the plurality of branch directions into a plurality of mutually parallel image light rays L3 to allow them to emerge toward the field of view region 6.

The projection optical system 5 projects the image light ray L1 which is output from the display element 2 and forms the image. Thus, the projection optical system 5 allows the image light ray L1 from the display element 2 to be incident on the light guide 4. As shown in FIG. 1 and FIG. 2, the projection optical system 5 is located between the display element 2 and the in-coupling region 41 of the light guide 4. The projection optical system 5 collimates the image light ray L1 from the display element 2 and allows it to be incident on the in-coupling region 41, for example. The projection optical system 5 allows the image light ray L1 to be incident on the in-coupling region 41 as substantial collimate light ray. The projection optical system 5 is, for example, a biconvex lens.

1.3 Simulations

Figure 12:
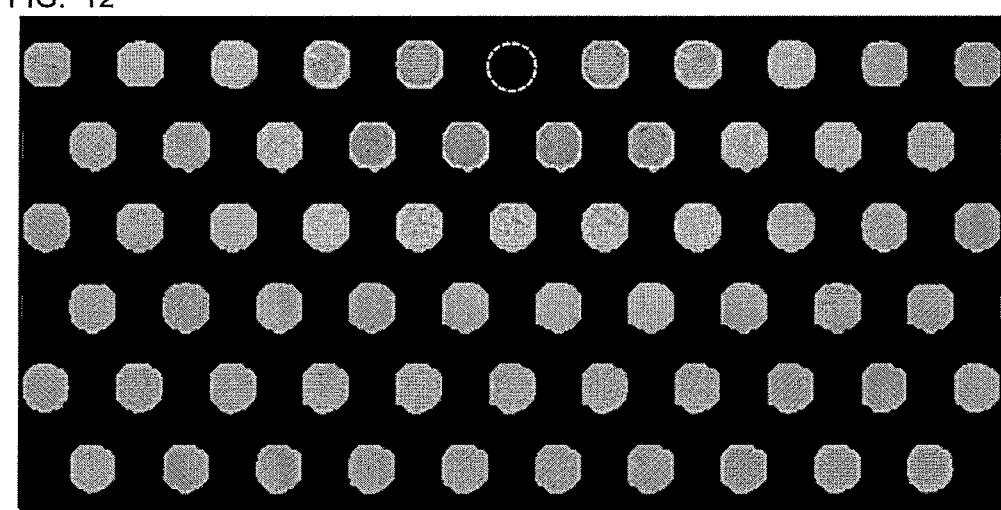
FIG. 12 is a diagram for illustration of a result of a simulation regarding light intensities of the light guide of FIG. 2.

To confirm effects of pupil expansion by the aforementioned light guide 4, a simulation was conducted for a distribution of light intensity at the periodic structures of the in-coupling region 41 and the exit region 42 of the light guide 4. FIG. 12 shows a result of the simulation regarding light intensities of the light guide 4. FIG. 12 shows a distribution of light intensity at each of plurality of parts set on the exit region 42 of the light guide 4 at a predetermined interval. In FIG. 12, part indicated by a white dashed circle corresponds to the in-coupling region 41. Herein, to show the effect of pupil in an understandable manner, a size of the pupil L10 of the image light ray L1 is set to prevent reproduced pupils from overlapping with each other. As apparent from FIG. 12, light is distributed over the almost entire exit region 42. In conclusion, it was confirmed that the pupil L10 of the image light ray L1 could be reproduced and expanded by the in-coupling region 41 and the exit region 42 which have periodicity in the three predetermined directions A1, A2, A3 intersecting each other within the predetermined plane perpendicular to the thickness direction T of the body 40.

1.4 Advantageous Effects

The aforementioned optical system 3 includes the light guide 4 for guiding the image light ray L1 which is output from the display element 2 and forms the image, to the field of view region 6 of the user as the virtual image. The light guide 4 includes the body 40 having a plate shape, and the in-coupling region 41 and the exit region 42 which are formed in the body 40. The in-coupling region 41 allows the image light ray L1 incident from the display element 2 to propagate within the body 40. The exit region 42 allows the image light ray L1 propagating within the body 40 to emerge from the body 40 toward the field of view region 6. The in-coupling region and the exit region includes the periodic structure constituted by the recessed or protruded parts 41a in relation to the thickness direction T of the body 40 which are arranged to have periodicity in the three predetermined directions A1, A2, A3 intersecting each other within the predetermined plane perpendicular to the thickness direction T of the body 40. The central axes C1 of the recessed or protruded parts 41a are inclined relative to the thickness direction T of the body 40. This configuration enables improvement of the use efficiency of the image light ray L1 from the display element 2.

Further, in the optical system 3, the inclined angles θ of the recessed or protruded parts 41a relative to the thickness direction T of the body 40 are larger than 20 degrees but smaller than 65 degrees. This configuration enables improvement of the use efficiency of the image light ray L1 from the display element 2.

Further, in the optical system 3, the in-coupling region 41 divides the image light ray L1 incident from the display element 2 into a plurality of the image light rays in a plurality of branch directions including first, second, and third branch directions D1, D2, D3 respectively parallel to the three predetermined directions A1, A2, A3, and allowing the plurality of image light rays to propagate within the body 40. This configuration enables improvement of the use efficiency of the image light ray L1 from the display element 2.

Further, In the optical system 3, when the wave vectors in the first, second, and third branch directions D1, D2, D3 of the periodic structure are denoted by k1, k2, k3, respectively, and a maximum value of absolute values of the wave vectors k1, k2, k3 in the first, second, and third branch directions D1, D2, D3 is denoted by km, the wave vectors k1, k2, k3 satisfy a relation of $|k1-k2+k3|<km/5$, preferably. $|k1-k2+k3|$ means an absolute value of a resultant vector represented by k1−k2+k3. In this regard, it is possible to reduce chromatic aberration of the image light ray L3 reaching the field of view region 6 of the user. This enables improvement of image quality. It is more preferable that the wave vectors k1, k2, k3 satisfy $|k1-k2+k3|<km/10$. In this case, even if a wavelength range of the image light ray L1 has a width of about +2 nm, chromatic aberration perceived by the user can be reduced to about 1 minute of arc. This enables further improvement of image quality. It is more preferable that the wave vectors k1, k2, k3 satisfy |k1−k2+k3|<km/50. In this case, even if a wavelength range of the image light ray L1 has a width of about ±10 nm, chromatic aberration perceived by the user can be reduced to about 1 minute of arc. This enables further improvement of image quality. It is more preferable that the wave vectors k1, k2, k3 satisfy |k1−k2+k3|=0. In this case, an angle of the image light ray L1 incident on the in-coupling region 41 is identical to an angle of the image light ray L3 emerging from the exit region 42 toward the field of view region 6. It is possible to keep the angle of the image light ray L1 unchanged. This enables further improvement of image quality.

Further, in the optical system 3, the plurality of branch directions further include the fourth branch direction D4. When the wave vector in the fourth branch direction D4 of the periodic structure is denoted by k4, k4 is equal to −k1. This configuration enables expansion of the field of view region 6.

Further, in the optical system 3, the absolute values of the wave vectors k1, k2, and k3 are identical to each other. This configuration enables arranging the pupils L10 of the image light ray L1 at a regular interval in the field of view region 6.

Further, in the optical system 3, the central axes C1 of the recessed or protruded parts 41a of the periodic structure of the in-coupling region 41 are inclined relative to the thickness direction T of the body 40 in each of the plane including the second branch direction D2 and the thickness direction T of the body 40 and the plane including the third branch direction D3 and the thickness direction T of the body 40. This configuration enables increasing amounts of light diffracted in the second branch direction D2 and light diffracted in the third branch direction D3 and therefore enables improvement of the use efficiency of the image light ray L1 from the display element 2. Note that, it is not always necessary that all of the central axes C1 of the recessed or protruded parts 41a of the periodic structure of the in-coupling region 41 are inclined relative to the thickness direction T of the body 40 in each of the plane including the second branch direction D2 and the thickness direction T of the body 40 and the plane including the third branch direction D3 and the thickness direction T of the body 40.

Further, in the optical system 3, the in-coupling region 41 is on the surface (the first surface 40a) on which the light image ray L1 is incident, of the body 40. The central axes C1 of the recessed or protruded parts 41a of the periodic structure of the in-coupling region 41 are: inclined in the opposite direction from the second branch direction D2, relative to the direction of the surface (the first surface 40a) on which the image light ray L1 is incident, of the body 40, in the plane including the second branch direction D2 and the thickness direction T of the body 40; and inclined in the opposite direction from the third branch direction D3, relative to the direction of the surface (the first surface 40a) on which the image light ray L1 is incident, of the body 40, in the plane including the third branch direction D3 and the thickness direction T of the body 40. This configuration enables increasing amounts of light diffracted in the second branch direction D2 and light diffracted in the third branch direction D3 and therefore enables improvement of the use efficiency of the image light ray L1 from the display element 2.

Further, in the optical system 3, the periodic structure of the in-coupling region 42 and the periodic structure of the exit region 43 have the same period in each of the three predetermined directions A1, A2, A3. That is, a period in the predetermined direction A1, of the in-coupling region 41 is identical to a period in the predetermined direction A1, of the exit region 42; a period in the predetermined direction A2, of the in-coupling region 42 is identical to a period in the predetermined direction A2, of the exit region 42; and a period in the predetermined direction A3, of the in-coupling region 41 is identical to a period in the predetermined direction A3, of the exit region 42. In this case, the periods in the predetermined directions A1, A2, A3, of the in-coupling region 41 are not necessarily identical to each other and the periods in the predetermined directions A1, A2, A3, of the exit region 42 are not necessarily identical to each other. This configuration enables simplification of the structure of the light guide 4.

Further, in the optical system 3, the exit region 42 divides the image light ray L1 from the in-coupling region 41 into a plurality of the image light rays, allows the plurality of image light rays to propagate within the body 40 in the plurality of branch directions including the first, second, and third branch directions D1, D2, D3 respectively parallel to the three predetermined directions A1, A2, A3, and allows the plurality of image light rays propagating in the plurality of branch directions within the body 40 to emerge from the body 40 toward the field of view region 6. This configuration enables improvement of the use efficiency of the image light ray L1 from the display element 2.

Further, in the optical system 3, the recessed or protruded parts 41a are arranged within the predetermined plane in a hexagonal lattice. This configuration enables downsizing the light guide 4.

Further, in the optical system 3, the light guide 4 reproduces the pupil of the image right ray L1 to expand the pupil by: dividing the image light ray L1 entering the light guide 4 from the in-coupling region 41 into a plurality of mutually parallel image light rays L1 in each of the three predetermined directions A1, A2, A3 to be allowed to emerge toward the field of view region 6. This configuration enables improvement of the use efficiency of the image light ray L1 from the display element 2.

Further, the optical system 3 further includes the projection optical system 5 allowing the image light ray L1 to be incident on the in-coupling region 41 of the light guide 4 as a substantial collimate light ray. This configuration enables improvement of the use efficiency of the image light ray L1.

The aforementioned image display device 1 includes the optical system 3 and the display element 2. This configuration enables improvement of the use efficiency of the image light ray L1 from the display element 2.

2. Variations

Embodiments of the present disclosure are not limited to the above embodiment. The above embodiment may be modified in various ways in accordance with designs or the like to an extent that they can achieve the problem of the present disclosure. Hereinafter, some variations or modifications of the above embodiment will be listed. One or more of the variations or modifications described below may apply in combination with one or more of the others.

2.1 Variation 1

Figure 13:
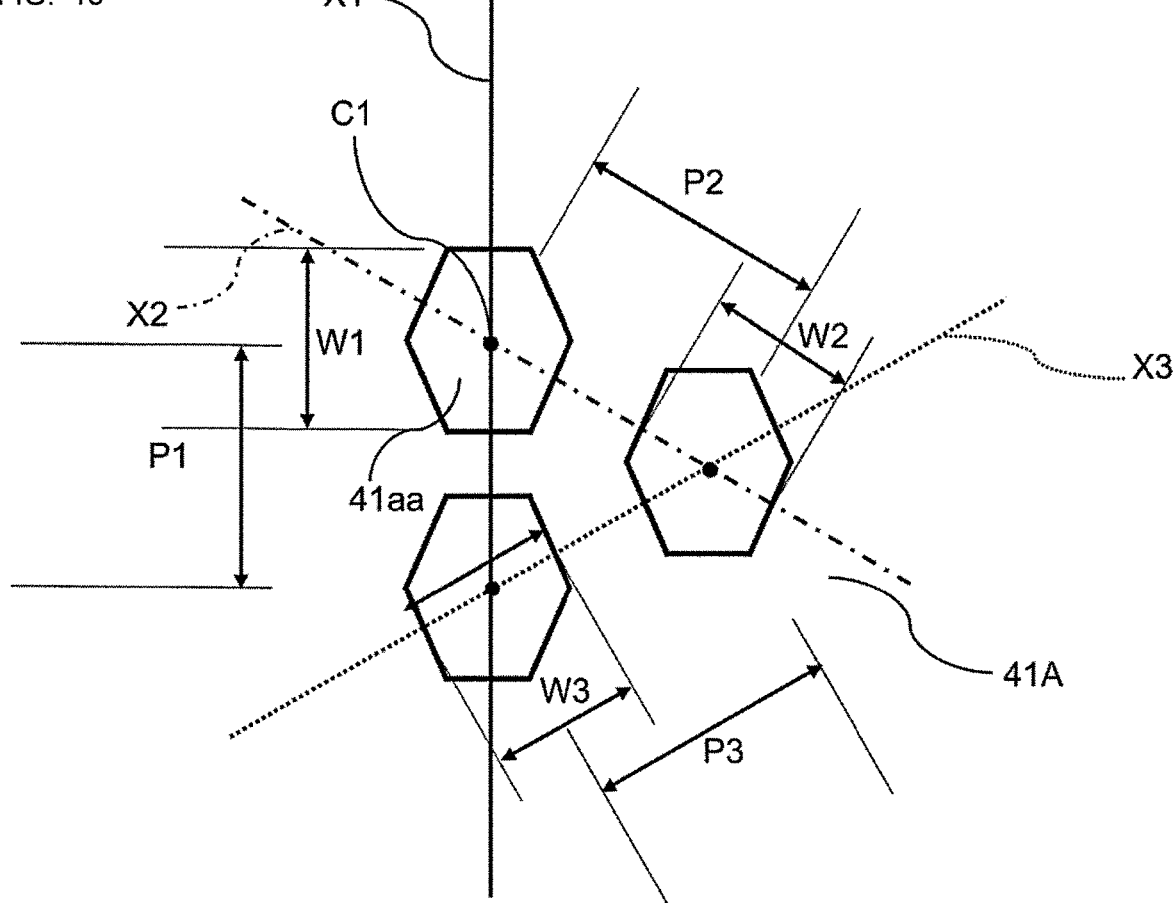
FIG. 13 is a plan view of a configuration example of an in-coupling region of a light guide of variation 1.

FIG. 13 is a plan view of a configuration example of an in-coupling region 41A of a light guide 4A of variation 1. In the in-coupling region 41A of FIG. 13, a recessed or protruded part 41*aa* has a hexagonal shape in its plan view, but is not a regular hexagonal shape in its plan view like the above embodiment.

In FIG. 13, periods P1, P2, P3 denote periods (grating periods) of arrangement of the recessed or protruded parts 41*aa* in the directions X1, X2, X3 perpendicular to the predetermined directions A1, A2, A3, respectively. Especially, the periods P1, P2, P3 are distances between central axes C1 of the recessed or protruded parts 41*aa* in the directions X1, X2, X3 perpendicular to the predetermined directions A1, A2, A3, respectively. Sizes W1, W2, W3 represent sizes (grating width) of the recessed or protruded parts 41*aa* in the directions X1, X2, X3 perpendicular to the predetermined directions A1, A2, A3, respectively. The ratios of the sizes W1, W2, W3 of the recessed or protruded parts 41*aa* relative to the periods P1, P2, P3 of arrangement of the recessed or protruded parts 41*aa* are denoted by ratios R1 (=W1/P1), R2 (=W2/P2), R3 (=W3/P3), respectively. In the in-coupling region 41A, appropriately setting the ratios R1, R2, R3 enables adjustment of the diffraction efficiencies in the individual branch directions.

In FIG. 13, the periods P1, P2, P3 are identical to each other. However, the size W1 is larger than the sizes W2, W3. The sizes W2, W3 are identical to each other. Therefore, the ratio R1 (=W1/P1) is larger than the ratio R2 (=W2/P2) and the ratio R3 (=W3/P3), and the ratios R2, R3 are identical to each other. In other words, the ratio of the size of the recessed or protruded parts 41*aa* relative to the period of arrangement of the recessed or protruded parts 41*aa* is larger in the direction perpendicular to the first branch direction D1 within the predetermined plane than in the direction perpendicular to the second branch direction D2 within the predetermined plane and the direction perpendicular to the third branch direction D3 within the predetermined plane. This configuration enables increasing an amount of light diffracted in a direction parallel to the first branch direction D1, and thus enables improvement of the use efficiency of the image light ray L1 from the display element 2. In this regard, in FIG. 13, the periods P1, P2, P3 are identical to each other, but not limited thereto, the periods P1, P2, P3 may be different periods to appropriately set the interval between the pupils L10 of the image light ray L1 at the field of view region 6.

Figure 14:
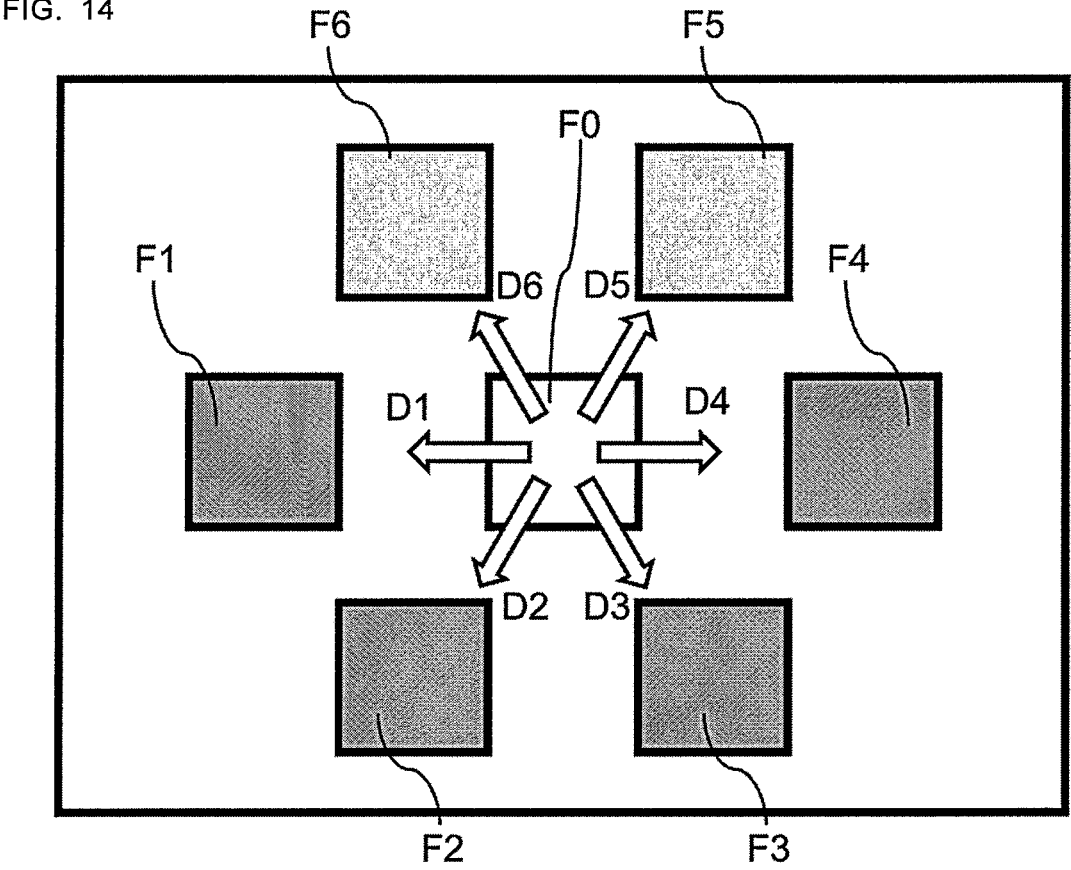
FIG. 14 is a diagram for illustration of a result of a simulation regarding a light diffraction efficiency of the periodic structure of FIG. 13.

To confirm this, a simulation regarding a light diffraction efficiency was conducted for the periodic structure including the recessed or protruded parts 41*aa* shown in FIG. 13. FIG. 14 is a diagram for illustration of a result of the simulation regarding the light diffraction efficiency of the periodic structure of FIG. 13. In FIG. 13, an efficiency F0 represents a zero-order diffraction efficiency when the image light ray L1 is incident on the periodic structure. Efficiencies F1 to F6 represent respective diffraction efficiencies achieved by the image light rays propagating in the first to sixth branch directions D1 to D6 when the image light ray L1 is incident on the periodic structure. In the simulation of FIG. 14, a darker color means that the efficiencies F0 to F6 are larger, and a lighter color means that the efficiencies F0 to F6 are smaller. As apparent from comparison between FIG. 7 and FIG. 14, in the periodic structure including the recessed or protruded parts 41*aa* shown in FIG. 13, the efficiencies F2, F3 decrease and instead the efficiencies F1, F4 increase. Therefore, by employing the periodic structure including the recessed or protruded parts 41*aa* shown in FIG. 13, in comparison to the periodic structure including the recessed or protruded parts 41*a* shown in FIG. 4, it is possible to decrease amounts of light propagating in the second and third branch directions D2, D3, and to increase an amount of light propagating in a direction parallel to the first branch direction D1 (that is, the first and fourth branch directions D1, D4). This enables improvement of the use efficiency of the image light ray L1 from the display element 2 and also improvement uniformity of amounts of light rays reaching the field of view region 6 of the user.

As described above, in the optical system 3, the ratio of the size of the recessed or protruded parts 41*aa* relative to the period of arrangement of the recessed or protruded parts 41*aa* is larger in the direction perpendicular to the first branch direction D1 within the predetermined plane than in the direction perpendicular to the second branch direction D2 within the predetermined plane and the direction perpendicular to the third branch direction D3 within the predetermined plane. This configuration enables improvement of an amount of light diffracted in a direction parallel to the first branch direction D1, and thus enables improvement of the uniformity of amounts of light rays reaching the field of view region 6 of the user together with improvement of the use efficiency of the image light ray L1 from the display element 2.

2.2 Variation 2

Figure 15:
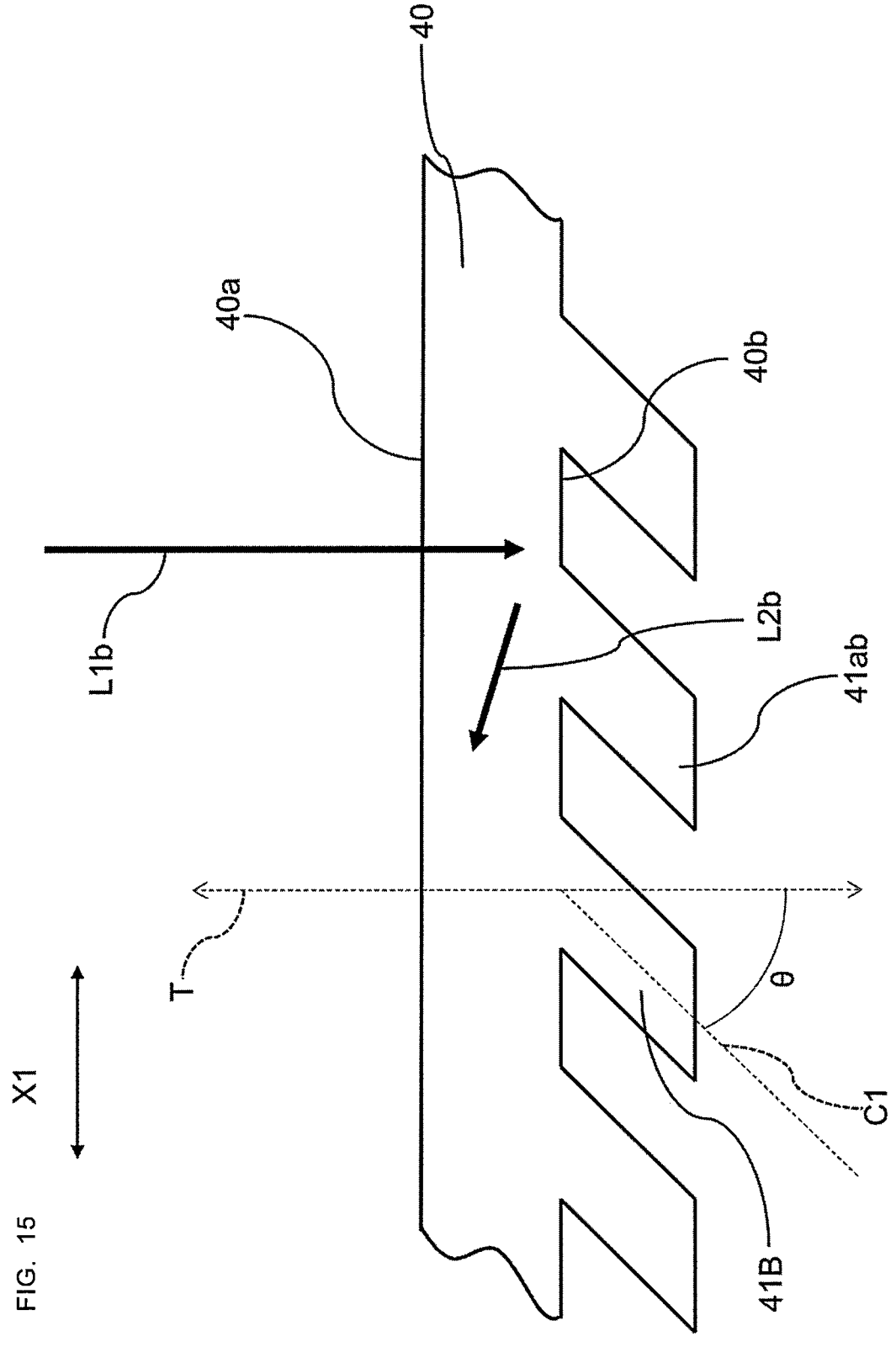
FIG. 15 is a sectional view of a configuration example of an in-coupling region of a light guide of variation 2.

FIG. 15 is a schematic view of a configuration example of an in-coupling region 41B of a light guide 4B of variation 2. The in-coupling region 41B of FIG. 15 is formed in the second surface 40*b* of the body 40. That is, the in-coupling region 41B is on a surface (the second surface 40*b*) from which the image light ray L1 emerges, in the body 40. The in-coupling region 41B is a diffraction grating having periodicity in the three predetermined directions A1, A2, A3 intersecting each other in the predetermined plane perpendicular to the thickness direction T of the body 40. Since the in-coupling region 41B is formed in the second surface 40*b* which is a surface facing the field of view region 6, of the body 40 (the surface from which the image light ray L1 emerges), the in-coupling region 41B is a reflection diffraction grating.

In the in-coupling region 41B of FIG. 15, the central axis C1 of the recessed or protruded part 41*ab* is inclined relative to the thickness direction (the upward/downward direction in FIG. 15) T of the body 40. In the in-coupling region 41B, by inclining the central axis C1 of the recessed or protruded part 41*ab* relative to the thickness direction T of the body 40, it is possible to control a light diffraction efficiency in the predetermined plane perpendicular to the thickness direction T of the body 40. The inclined angle θ of the central axis C1 of the recessed or protruded part 41*ab* relative to the thickness direction (the upward/downward direction in FIG. 15) T of the body 40 is set to be larger than 20 degrees and smaller than 65 degrees, for example.

In FIG. 15, the central axis C1 of the recessed or protruded part 41*ab* is inclined in the direction X1 perpendicular to the predetermined direction A1. Thus, the central axis C1 of the recessed or protruded part 41*ab* is inclined relative to the thickness direction T of the body 40 in the plane including the second branch direction D2 and the thickness direction T of the body 40 and in the plane including the third branch direction D3 and the thickness direction T of the body 40. In FIG. 15, the central axis C1 of the recessed or protruded parts 41*ab* is inclined in the second branch direction D2 relative to a direction (a downward direction in FIG. 15) of the surface (the second surface 40*b*) from which the image light ray L1 emerges in the body 40, in the plane including the second branch direction D2 and the thickness direction T of the body 40, and is inclined in the third branch direction D3 relative to the direction (a downward direction in FIG. 15) of the surface (the second surface 40b) from which the image light ray L1 emerges in the body 40, in the plane including the third branch direction D3 and the thickness direction T of the body 40. In summary, the central axis C1 of the recessed or protruded part 41ab is inclined in the second branch direction D2 and the third branch direction D3 relative to the second surface 40b of the body 40. Owing to this, it becomes easy for the in-coupling region 41B to allow the image light ray L1b incident on the recessed or protruded part 41ab to propagate within the body 40 as the image light ray L2b traveling in the second branch direction D2 or the third branch direction D3. Thus, it is possible to decrease diffraction of the image light ray L1b in the opposite direction from the second branch direction D2 or the third branch direction D3 and therefore the image light ray L1b is allowed to propagate toward the field of view region 6 of the user efficiently. In this regard, side surfaces of the recessed or protruded part 41ab of FIG. 15 are inclined with being parallel to each other. However, the structure of the recessed or protruded part 41ab is not limited thereto, but may be a tapered structure in which a grating width becomes smaller as further from the second surface 40b or stepwise (multilevel) structure.

As described above, the in-coupling region 41B is on the surface (the second surface 40b) from which the light image ray L1 emerges, of the body 40. The central axes C1 of the recessed or protruded parts 41ab of the periodic structure of the in-coupling region 41B are: inclined in the second branch direction D2, relative to the direction of the surface (the second surface 40b) from which the image light ray L1 emerges, of the body 40, in the plane including the second branch direction D2 and the thickness direction T of the body 40; and inclined in the third branch direction D3, relative to the direction of the surface (the second surface 40b) from which the image light ray L1 emerges, of the body 40, in the plane including the third branch direction D3 and the thickness direction T of the body 40. This configuration enables increasing amounts of light diffracted in the second branch direction D2 and light diffracted in the third branch direction D3 and therefore enables improvement of the use efficiency of the image light ray L1 from the display element 2.

2.3 Variation 3

Figure 16:
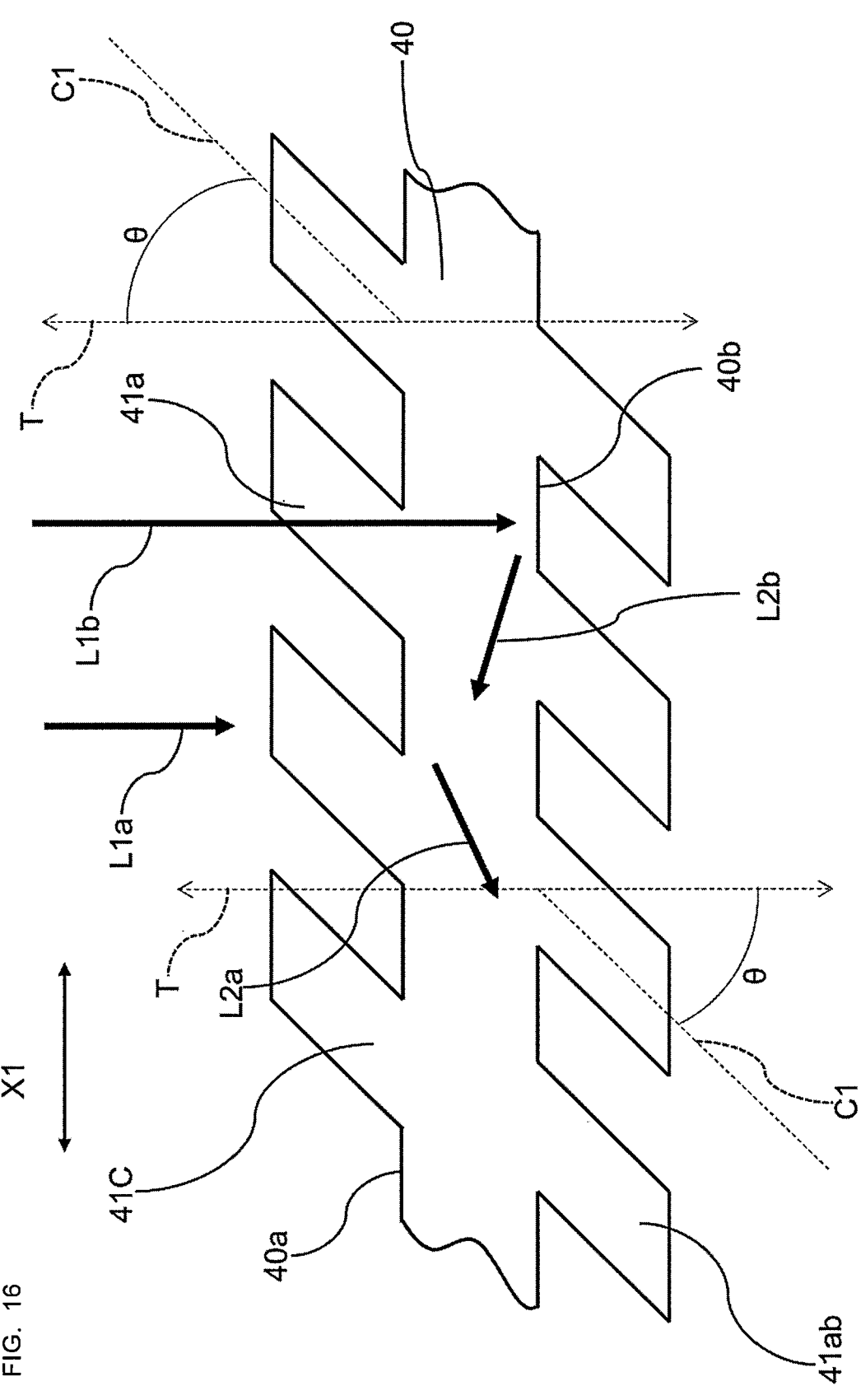
FIG. 16 is a sectional view of a configuration example of an in-coupling region of a light guide of variation 3.

FIG. 16 is a schematic view of a configuration example of an in-coupling region 41C of a light guide 4C of variation 3. The in-coupling region 41C of FIG. 16 is formed on the first surface 40a and the second surface 40b of the body 40C. That is, the in-coupling region 41C is on the surface (the first surface 40a) on which the light image ray L1 is incident, of the body 40, and is on the surface (the second surface 40b) from which the image light ray L1 emerges, in the body 40. In more detail, the in-coupling region 41C includes the periodic structure constituted by the recessed or protruded parts 41a on the surface (the first surface 40a) on which the light image ray L1 is incident, of the body 40, and the periodic structure constituted by the recessed or protruded parts 41a on the surface (the second surface 40b) from which the light image ray L1 emerges, of the body 40. The in-coupling region 41C is a diffraction grating having periodicity in the three predetermined directions A1, A2, A3 intersecting each other in the predetermined plane perpendicular to the thickness direction T of the body 40. The in-coupling region 41C includes a reflection diffraction grating and a transmission diffraction grating.

Also in the in-coupling region 41C of FIG. 16, the central axes C1 of the recessed or protruded parts 41a, 41ab are inclined relative to the thickness direction (the upward/downward direction in FIG. 5) T of the body 40. In the in-coupling region 41C, by inclining the central axes C1 of the recessed or protruded parts 41a, 41ab relative to the thickness direction T of the body 40, it is possible to control a light diffraction efficiency in the predetermined plane perpendicular to the thickness direction T of the body 40. In FIG. 16, the recessed or protruded parts 41a, 41ab are inclined in the direction X1 perpendicular to the predetermined direction A1. Thus, the recessed or protruded parts 41a, 41ab are inclined relative to the thickness direction T of the body 40 in the plane including the second branch direction D2 and the thickness direction T of the body 40 and in the plane including the third branch direction D3 and the thickness direction T of the body 40.

Especially in FIG. 16, the central axis C1 of the recessed or protruded parts 41a on the first surface 40a is inclined in the opposite direction from the second branch direction D2 relative to the direction of the surface (the first surface 40a) on which the image light ray L1 is incident in the body 40, in the plane including the second branch direction D2 and the thickness direction T of the body 40, and is inclined in the opposite direction from the third branch direction D3 relative to the direction of the surface (the first surface 40a) on which the image light ray L1 is incident in the body 40, in the plane including the third branch direction D3 and the thickness direction T of the body 40. In summary, the central axis C1 of the recessed or protruded part 41a on the first surface 40a is inclined in the opposite direction from the second branch direction D2 and the third branch direction D3 relative to the first surface 40a of the body 40. Owing to this, as shown in FIG. 16, it becomes easy for the in-coupling region 41C to allow the image light ray L1a incident on the recessed or protruded part 41a to propagate within the body 40 as the image light ray L2a traveling in the second branch direction D2 or the third branch direction D3. Thus, it is possible to decrease diffraction of the image light ray L1a in the opposite direction from the second branch direction D2 or the third branch direction D3. The inclined angle $\theta$ of the central axis C1 of the recessed or protruded part 41a relative to the thickness direction (the upward/downward direction in FIG. 16) T of the body 40 is set to be larger than 20 degrees and smaller than 65 degrees, for example.

Further, in FIG. 16, the central axis C1 of the recessed or protruded parts 41ab on the second surface 40b is inclined in the second branch direction D2 relative to the direction of the surface (the second surface 40b) from which the image light ray L1 emerges in the body 40, in the plane including the second branch direction D2 and the thickness direction T of the body 40, and is inclined in the third branch direction D3 relative to the direction of the surface (the second surface 40b) from which the image light ray L1 emerges in the body 40, in the plane including the third branch direction D3 and the thickness direction T of the body 40. In summary, the central axis C1 of the recessed or protruded part 41ab on the second surface 40b is inclined in the second branch direction D2 and the third branch direction D3 relative to the second surface 40b of the body 40. Owing to this, as shown in FIG. 16, it becomes easy for the in-coupling region 41C to allow the image light ray L1b incident on the recessed or protruded part 41ab to propagate within the body 40 as the image light ray L2b traveling in the second branch direction D2 or the third branch direction D3. Thus, it is possible to decrease diffraction of the image light ray L1b in the opposite direction from the second branch direction D2 or the third branch direction D3. The inclined angle θ of the central axis C1 of the recessed or protruded part 41*ab* relative to the thickness direction (the upward/downward direction in FIG. 16) T of the body 40 is set to be larger than 20 degrees and smaller than 65 degrees, for example.

As described above, the in-coupling region 41C may be formed in the first surface 40*a* and the second surface 40*b* of the body 40C. This enables decreasing possibility that the image light ray L1 passes through the light guide 4C, and thus enables improvement of the use efficiency of the image light ray L1.

2.4 Variation 4

Figure 17:
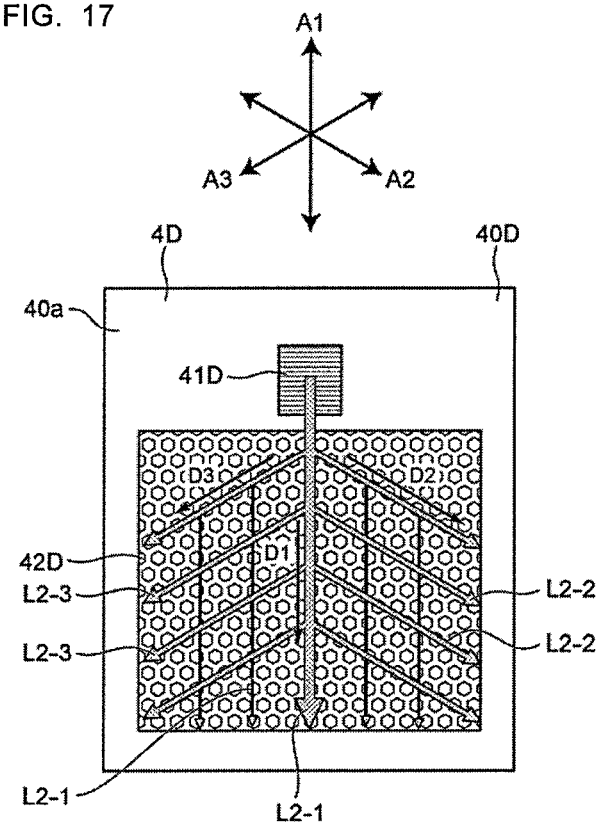
FIG. 17 is a plan view of a configuration example of a light guide of variation 4.

FIG. 17 is a schematic view of a configuration example of a light guide 4D of a variation 4. The light guide 4D of FIG. 17 includes an in-coupling region 41D and an exit region 42D.

The in-coupling region 41D is a diffraction grating having periodicity in the predetermined direction A1 in the predetermined plane perpendicular to the thickness direction (a direction perpendicular to sheet of FIG. 17) of the body 40D. The in-coupling region 41D is formed in the first surface 40*a* of the body 40D. The diffraction grating of the in-coupling region 41D may include a plurality of recesses or protrusions which extend in a direction perpendicular to the predetermined direction A1 within the predetermined plane and are arranged at a predetermined interval along the predetermined direction A1. The in-coupling region 41D uses diffraction to allow the image light ray L1 to be incident on the body 40 of the light guide 4 to meet a condition where it is totally reflected by the first surface 40*a* and the second surface 40*b*. The in-coupling region 41D converts the image light ray L1 into an image light ray L2-1 traveling in the first branch direction D1 parallel to the predetermined direction A within the light guide 4 (i.e., within the body 40D) while being totally reflected by the first surface 40*a* and the second surface 40*b*.

The exit region 42D includes a periodic structure constituted by recessed or protruded parts 41*ad* arranged to have periodicity in the three predetermined directions A1, A2, A3 intersecting each other in the predetermined plane perpendicular to the thickness direction of the body 40D. The exit region 42D is formed in the first surface 40*a* of the body 40D. Since the exit region 42D has periodicity in the three predetermined directions A1, A2, A3, the exit region 42D allows part of the image light ray L2-1 from the in-coupling region 41D to branch off in a branch direction different from a branch direction corresponding to the image light ray L2-1. FIG. 17 indicates that a plurality of image light rays L2-2 traveling in the second branch direction D2 and a plurality of image light rays L2-3 traveling in the third branch direction D3 branch off from the image light ray L2-1 traveling in the first branch direction D1 from the in-coupling region 41D, as one example. FIG. 17 indicates that a plurality of image light rays L2-1 traveling in the first branch direction D1 branch off from the image light rays L2-2, L2-3 traveling in the second branch direction D2 and the third branch direction D3, as one example.

As described above, by the exit region 42D, the image light rays L2-1 are divided within the body 40D into the image light rays L2-1 to L2-3 traveling individually in the plurality of branch directions and thus spreads within the predetermined plane perpendicular to the thickness direction of the body 40D. The plurality of image light rays L2-1 to L2-3 respectively traveling in the plurality of branch directions D1 to D3 each are divided into a plurality of mutually parallel image light rays to be allowed to emerge from the body 40D toward the field of view region 6.

The aforementioned optical system 3 includes the light guide 4D for guiding the image light ray L1 which is output from the display element 2 and forms the image, to the field of view region 6 of the user as the virtual image. The light guide 4D includes the body 40D having a plate shape, and the in-coupling region 41D and the exit region 42D which are formed in the body 40D. The in-coupling region 41D allows the image light ray L1 incident from the display element 2 to propagate within the body 40D. The exit region 42D allows the image light ray L1 propagating within the body 40D to emerge from the body 40D toward the field of view region 6. The exit region 42D includes the periodic structure constituted by the recessed or protruded parts 41*ad* in relation to the thickness direction of the body 40D which are arranged to have periodicity in the three predetermined directions A1, A2, A3 intersecting each other within the predetermined plane perpendicular to the thickness direction of the body 40D. The central axes of the recessed or protruded parts 41*ad* are inclined relative to the thickness direction of the body 40D. This configuration enables improvement of the use efficiency of the image light ray L1 from the display element 2.

2.5 Variation 5

Figure 18:
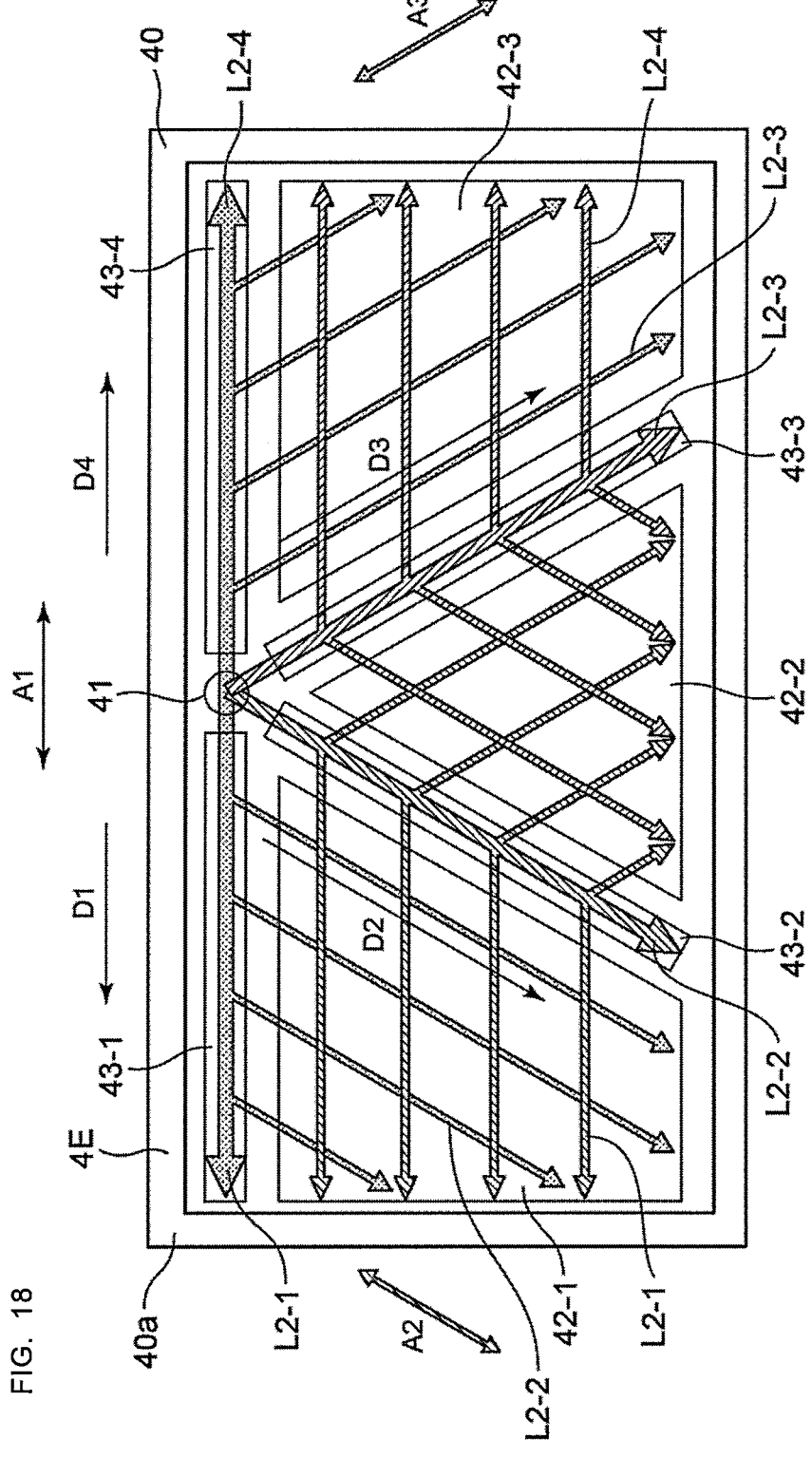
FIG. 18 is a plan view of a configuration example of a light guide of variation 5.

FIG. 18 is a schematic view of a configuration example of a light guide 4E of variation 5. The light guide 4E of FIG. 18 includes an in-coupling region 41, a plurality of exit regions 42-1 to 42-3, and a plurality of propagation regions 43-1 to 43-4.

The in-coupling region 41 is formed in the first surface 40*a* of the body 40. The in-coupling region 41 is located inside the predetermined rectangular region of the first surface 40*a* of the body 40 and is located at one end in the width direction of the rectangular region and at the center in the length direction of the rectangular region. The in-coupling region 41 has the same or similar structure as or to the above embodiment, and, as shown in FIG. 4, includes the periodic structure constituted by the recessed or protruded parts 41*a* arranged to have periodicity in three predetermined directions A1, A2, A3. Therefore, the in-coupling region 41 divides the image light ray L1 incident from the display element 2, into a plurality of image light rays in the plurality of branch directions allowed to propagate within the body 40. The plurality of branch directions include the first, second, and third branch directions D1, D2, D3 respectively parallel to the three predetermined directions A1, A2, A3. The plurality of branch directions further include the fourth branch direction D4. The fourth branch direction D4 is an opposite direction from the first branch direction D1. The in-coupling region 41 uses diffraction to allow the image light ray L1 to be incident on the body 40 of the light guide 4E to meet a condition where it is totally reflected by the first surface 40*a* and the second surface 40*b*.

The plurality of exit regions 42-1 to 42-3 and the plurality of propagation regions 43-1 to 43-4 are formed in the first surface 40*a* of the body 40. The plurality of propagation regions 43-1 to 43-4 extend from the in-coupling region 41 in the first to fourth directions D1 to D4, respectively. The exit region 42-1 is located between the propagation regions 43-1, 43-2. The exit region 42-2 is located between the propagation regions 43-2, 43-3. The exit region 42-3 is located between the propagation regions 43-3, 43-4.

The propagation region 43-1 extends from the in-coupling region 41 in the first branch direction D1. The propagation region 43-1 allows the image light rays L2-1 from the in-coupling region 41 to propagate in the first branch direction D1 and direct part of the image light rays L2-1 toward the exit region 42-1. The propagation region 43-1 is, for example, a reflection diffraction grating having periodicity in the predetermined direction A2. The propagation region 43-2 extends from the in-coupling region 41 in the second branch direction D2. The propagation region 43-2 allows the image light rays L2-2 from the in-coupling region 41 to propagate in the second branch direction D2 and directs part of the image light rays L2-2 toward the exit regions 42-1, 42-2. The propagation region 43-2 is, for example, a reflection diffraction grating having periodicity in the predetermined directions A1, A3. The propagation region 43-3 extends from the in-coupling region 41 in the third branch direction D3. The propagation region 43-3 allows the image light rays L2-3 from the in-coupling region 41 to propagate in the third branch direction D3 and directs part of the image light rays L2-3 toward the exit regions 42-2, 42-3. The propagation region 43-3 is, for example, a reflection diffraction grating having periodicity in the predetermined directions A2, A1. The propagation region 43-4 extends from the in-coupling region 41 in the fourth branch direction D4. The propagation region 43-4 allows the image light rays L2-4 from the in-coupling region 41 to propagate in the fourth branch direction D4 and directs part of the image light rays L2-4 toward the exit region 42-3. The propagation region 43-4 is, for example, a reflection diffraction grating having periodicity in the predetermined direction A1.

The exit region 42-1 allows each image light ray L2-2 from the propagation region 43-1 to propagate in the second branch direction D2 and allows part of each image light ray L2-2 to emerge from the body 40 of the light guide 4E toward the field of view region 6. The exit region 42-1 allows each image light ray L2-1 from the propagation region 43-2 to propagate in the first branch direction D1 and allows part of each image light ray L2-1 to emerge from the body 40 of the light guide 4E toward the field of view region 6. The exit region 42-1 is, for example, a reflection diffraction grating having periodicity in the predetermined directions A1, A2. The exit region 42-2 allows each image light ray L2-3 from the propagation region 43-2 to propagate in the third branch direction D3 and allows part of each image light ray L2-3 to emerge from the body 40 of the light guide 4E toward the field of view region 6. The exit region 42-2 allows each image light ray L2-2 from the propagation region 43-3 to propagate in the second branch direction D2 and allows part of each image light ray L2-2 to emerge from the body 40 of the light guide 4E toward the field of view region 6. The exit region 42-2 is, for example, a reflection diffraction grating having periodicity in the predetermined directions A2, A3. The exit region 42-3 allows each image light ray L2-4 from the propagation region 43-3 to propagate in the fourth branch direction D4 and allows part of each image light ray L2-4 to emerge from the body 40 of the light guide 4E toward the field of view region 6. The exit region 42-3 allows each image light ray L2-3 from the propagation region 43-4 to propagate in the third branch direction D3 and allows part of each image light ray L2-3 to emerge from the body 40 of the light guide 4E toward the field of view region 6. The exit region 42-3 is, for example, a reflection diffraction grating having periodicity in the predetermined directions A3, A1.

As described above, by the in-coupling region 41, the image light ray L1 is divided within the body 40 into the plurality of image light rays L2-1 to L2-4 traveling respectively in the plurality of branch directions and thus spreads within the predetermined plane perpendicular to the thickness direction of the body 40. The plurality of image light rays L2-1 traveling in the first branch direction D1, the plurality of image light rays L2-2 traveling in the second branch direction D2, the plurality of image light rays L2-3 traveling in the third branch direction D3, and the plurality of image light rays L2-4 traveling in the fourth branch direction D4 are allowed to emerge from the body 40 toward the field of view region 6.

The aforementioned optical system 3 includes the light guide 4E for guiding the image light ray L1 which is output from the display element 2 and forms the image, to the field of view region 6 of the user as the virtual image. The light guide 4E includes the body 40 having a plate shape, and the in-coupling region 41 and the exit regions 42-1 to 42-3 which are formed in the body 40. The in-coupling region 41 allows the image light ray L1 incident from the display element 2 to propagate within the body 40. The exit regions 42-1 to 42-3 each allow the image light ray L1 propagating within the body 40 to emerge from the body 40 toward the field of view region 6. The in-coupling region 41 includes the periodic structure constituted by the recessed or protruded parts 41*a* in relation to the thickness direction of the body 40 which are arranged to have periodicity in the three predetermined directions A1, A2, A3 intersecting each other within the predetermined plane perpendicular to the thickness direction of the body 40. The central axes of the recessed or protruded parts 41*a* are inclined relative to the thickness direction of the body 40. This configuration enables improvement of the use efficiency of the image light ray L1 from the display element 2.

2.6 Variation 6

Figure 19:
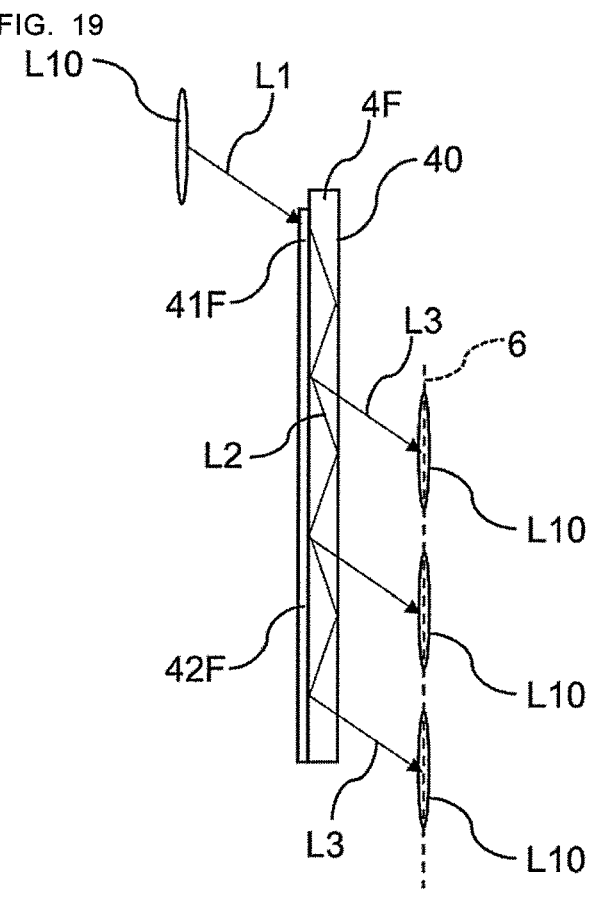
FIG. 19 is an explanatory view of a configuration example of an optical system of variation 6.

FIG. 19 is a schematic view of a configuration example of a light guide 4F of variation 6. In FIG. 19, to show a function of pupil expansion of the image display device in an understandable manner, a pupil L10 is depicted instead of the display element 2 and the projection optical system 5. In FIG. 19, the light guide 4F is located to allow the image light ray L1 to be incident on an in-coupling region 41F along a direction inclined to the thickness direction of the body 40. Also in this case, the light guide 4F reproduces the pupil L10 of the image right ray L1 to expand the pupil by: dividing the image light ray L1 entering the body 40 from the in-coupling region 41F into a plurality of the image light rays L2 in the plurality of branch directions; further dividing the plurality of image light rays L2 propagating in the plurality of branch directions into a plurality of mutually parallel image light rays L3; and allowing the plurality of image light rays L3 to emerge toward the field of view region 6.

Depending on an angle of the image light ray L1 incident on the in-coupling region 41F, an angle of propagation in the light guide 4F becomes larger. This may result in an increase in a region of the field of view region 6 where the pupil L10 of the image light ray L1 does not exist. In such cases, by appropriately setting the wave vectors k1, k2, k3, k4 of the periodic structure can reduce the region of the field of view region 6 where the pupil L10 of the image light ray L1 does not exist.

Figure 20:
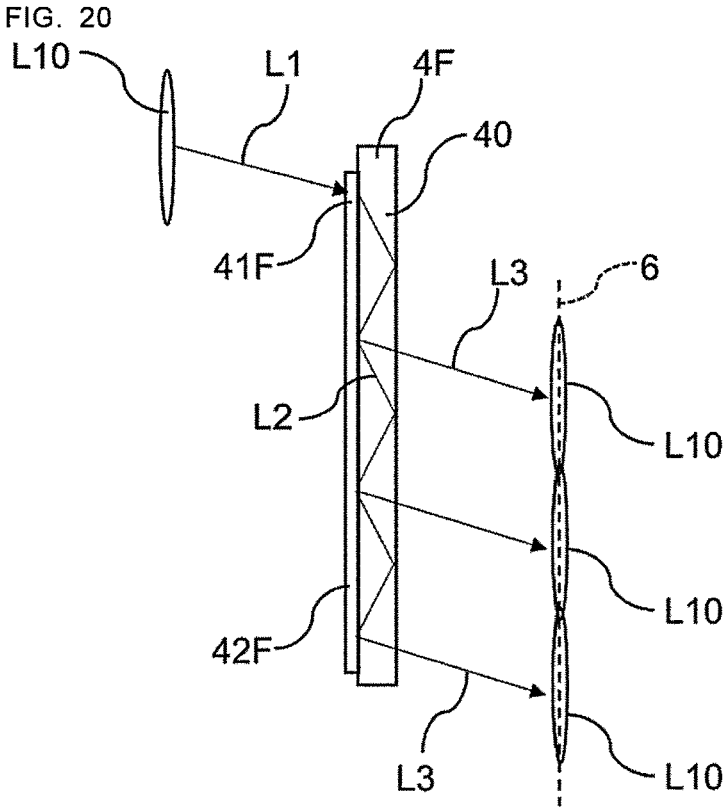
FIG. 20 is an explanatory view of another configuration example of an optical system of variation 6.
Figure 21:
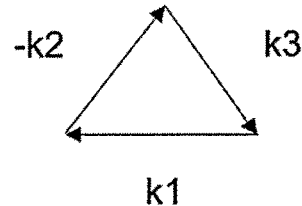
FIG. 21 is an explanatory view of an example of wave vectors of a periodic structure of a light guide of the optical system of FIG. 20.

FIG. 20 is a schematic view of another configuration example of the light guide 4F of variation 6. In FIG. 20, to show a function of pupil expansion of the image display device in an understandable manner, the pupil L10 is depicted instead of the display element 2 and the projection optical system 5. Also in FIG. 20, the light guide 4F is located to allow the image light ray L1 to be incident on the in-coupling region 41F along a direction inclined to the thickness direction of the body 40. In FIG. 20, the wave vectors k1, k2, k3, k4 of the periodic structures of the in-coupling region 41F and the exit region 42F are appropriately set to reduce the region of the field of view region 6 where the pupil L10 of the image light ray L1 does not exist. FIG. 21 is an explanatory view of an example of the wave vectors k1, k2, k3 of the periodic structures of the in-coupling region 41F and the exit region 42F of FIG. 20. In FIG. 21, the wave vectors k1, k2, k3 satisfy a relation of |k1−k2+k3|=0 and absolute values of two of the wave vectors k1, k2, k3 are identical to each other. In FIG. 21, the absolute values of the wave vectors k2, k3 are identical to each other. The wave vectors k1, k2, k3 constitutes an isosceles triangle. The absolute value of the wave vectors k1 is larger than the absolute values of the wave vectors k2, k3. For example, the angle between the wave vectors k1, k2 is 55 degrees, and the angle between the wave vectors k1, k3 is 125 degrees. In this case, the angle between the wave vectors k3, k4 is 55 degrees. In contrast, in the above embodiment, the absolute values of the wave vectors k1, k2, k3 are identical to each other and the angle between the wave vectors k1, k2 is 60 degrees and the angle between the wave vectors k1, k3 is 120 degrees. In this case, the angle between the wave vectors k3, k4 is 60 degrees. According to the wave vectors k1, k2, k3 of FIG. 21, in comparison with the above embodiment, an interval between the pupils L10 of the image light ray L1 can be narrowed in a direction perpendicular to the first branch direction D1 corresponding to a direction of the wave vector k1 within a plane perpendicular to the thickness direction of the body 40 (see FIG. 20).

In FIG. 21, the absolute values of the wave vectors k2, k3 are identical to each other, and the absolute value of the wave vectors k1 is larger than the absolute values of the wave vectors k2, k3. By doing so, even when the angle of the image light ray L1 incident on the in-coupling region 41F is set to increase the angle of propagation in the light guide 4F, it is possible to reduce the region of the field of view region 6 where the pupil L10 of the image light ray L1 does not exist. Further, the absolute value of the wave vectors k1 may be smaller than the absolute values of the wave vectors k2, k3. By doing so, even when the angle of the image light ray L1 incident on the in-coupling region 41F is set to decrease the angle of propagation in the light guide 4F, it is possible to appropriately adjust the interval between the pupils L10 of the image light ray L1 at the field of view region 6. Further, the absolute values of the wave vectors k2, k3 are not necessarily identical to each other. It is sufficient that absolute values of two of the wave vectors k1, k2, k3 are identical to each other.

Figure 22:
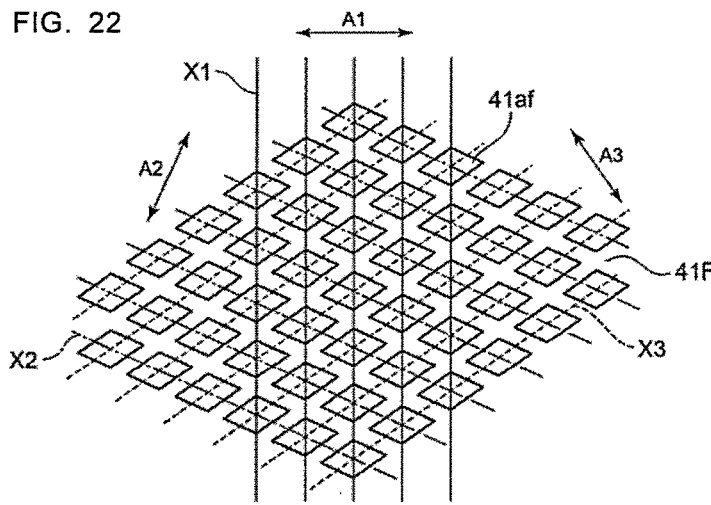
FIG. 22 is an explanatory view of another configuration example of the periodic structure of variation 6.

FIG. 22 is an explanatory view of a configuration example of a periodic structure of another configuration example of the light guide 4F of variation 6. FIG. 22 shows the periodic structure of the in-coupling region 41F. In the light guide 4F, the periodic structure of the in-coupling region 41F and the periodic structure of the exit region 42F have the same configuration. The in-coupling region 41F of FIG. 22 includes a diffraction grating constituted by recessed or protruded parts 41*af* in relation to the thickness direction of the body 40 which are arranged within the predetermined plane to have periodicity in the three predetermined directions A1, A2, A3. In FIG. 22, each recessed or protruded part 41*af* is a protrusion with a quadrilateral shape (parallelogram shape in the figures) in its plan view. The recessed or protruded parts 41*af* of FIG. 22 satisfy the aforementioned condition (1) "in the predetermined direction A1, rows of the recessed or protruded parts 41*af* arranged in a direction X1 perpendicular to the predetermined direction A1 are arranged at a regular interval", the condition (2) "in the predetermined direction A2, rows of the recessed or protruded parts 41*af* arranged in a direction X2 perpendicular to the predetermined direction A2 are arranged at a regular interval", and the condition (3) "in the predetermined direction A3, rows of the recessed or protruded parts 41*af* arranged in a direction X3 perpendicular to the predetermined direction A3 are arranged at a regular interval". Note that, in FIG. 22, the recessed or protruded parts 41*af* is not inclined relative to the thickness direction of the body 40. This is just for simplification of the figure. Actually, the recessed or protruded parts 41*af* is made to be inclined relative to the thickness direction of the body 40.

Figure 23:
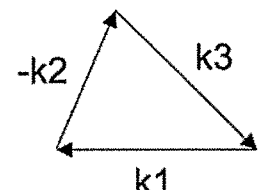
FIG. 23 is an explanatory view of an example of wave vectors of the periodic structure of FIG. 22.

FIG. 23 is an explanatory view of an example of the wave vectors k1, k2, k3 of the periodic structure of FIG. 22. In FIG. 23, the wave vectors k1, k2, k3 satisfy a relation of |k1−k2+k3|=0 but the absolute values of the wave vectors k1, k2, k3 are different from each other. For example, the absolute value of the wave vector k3 is larger than the absolute values of the wave vectors k1, k2 and the absolute value of the wave vector k1 is larger than the absolute value of the wave vector k2. For example, the angle between the wave vectors k1, k2 is 65 degrees, and the angle between the wave vectors k1, k3 is 125 degrees. In this case, the angle between the wave vectors k3, k4 is 55 degrees. According to the wave vectors k1, k2, k3 of FIG. 23, even when the image light ray L1 is incident in an arbitrary direction inclined to the thickness direction of the light guide 4F, it is possible to appropriately adjust the interval between the pupils L10 of the image light ray L1 at the field of view region 6. By appropriately setting the relation between the absolute values of the wave vectors k1, k2, k3 in consideration of arrangement of the pupils L10 of the image light ray L1 at the field of view region 6 as described above, the interval between the pupils L10 of the image light ray L1 at the field of view region 6 can be adjusted appropriately.

As described above, in the light guide 4F, two of the absolute values of the wave vectors k1, k2, and k3 may be identical to each other. This configuration enables adjusting locations of the pupils L10 of the image light ray L1 in the field of view region 6. Further, in the light guide 4F, the absolute values of the wave vectors k1, k2, and k3 may be different from each other. This configuration also enables adjusting locations of the pupils L10 of the image light ray L1 in the field of view region 6.

2.7 Variation 7

Figure 24:
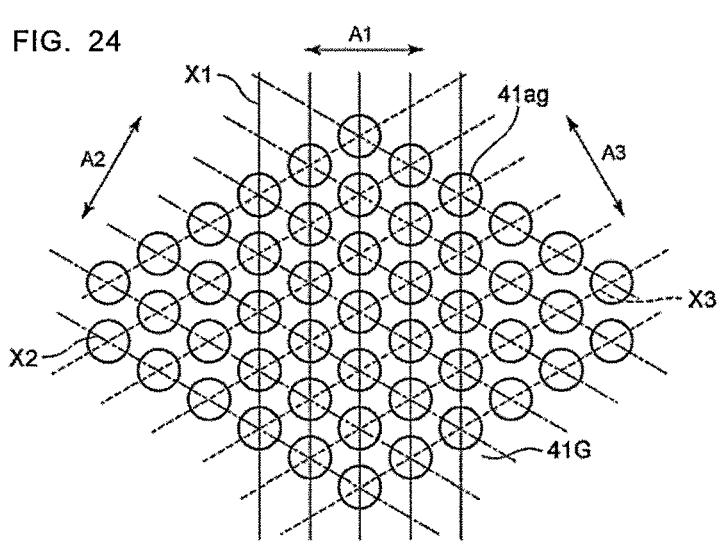
FIG. 24 is an explanatory view of a configuration example of a periodic structure of a light guide of variation 7.
Figure 25:
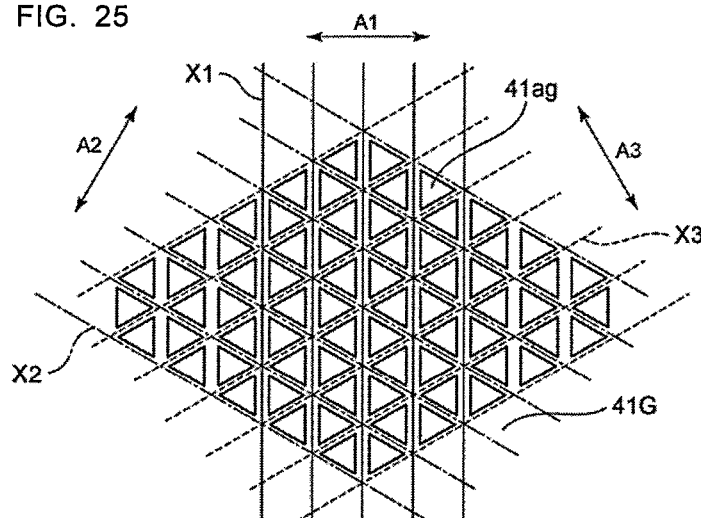
FIG. 25 is an explanatory view of another configuration example of the periodic structure of the light guide of variation 7.
Figure 26:
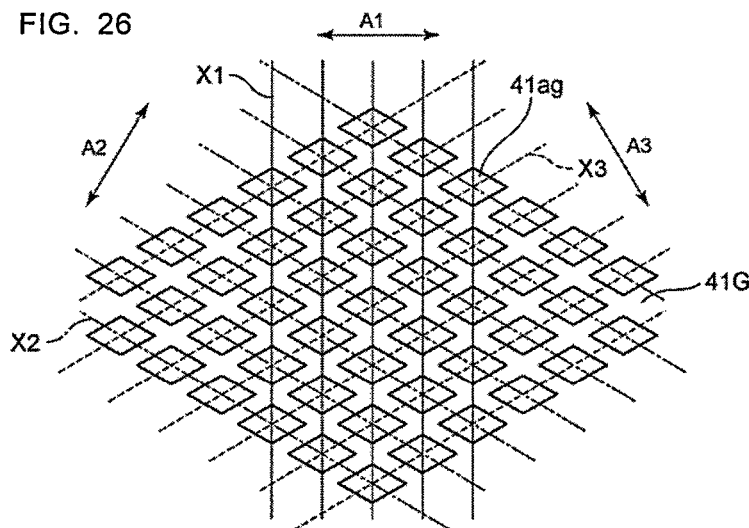
FIG. 26 is an explanatory view of another configuration example of the periodic structure of the light guide of variation 7.

FIG. 24 to FIG. 26 are explanatory views of configuration examples of the in-coupling region 41 of a light guide 4G of variation 7. In FIG. 24 to FIG. 26, the in-coupling region 41 includes a periodic structure constituted by recessed or protruded parts 41*ag* in relation to the thickness direction of the body 40 which are arranged within the predetermined plane to have periodicity in the three predetermined directions A1, A2, A3. Note that, in FIG. 24 to FIG. 26, the recessed or protruded parts 41*ag* is not inclined relative to the thickness direction of the body 40. This is just for simplification of the figures. Actually, the recessed or protruded parts 41*ag* is made to be inclined relative to the thickness direction of the body 40.

In FIG. 24, each recessed or protruded part 41*ag* is a protrusion with a true circle shape in its plan view. In FIG.

25, each recessed or protruded part 41*ag* is a protrusion with a triangle shape (regular triangle shape in figures) in its plan view. In FIG. 26, each recessed or protruded part 41*ag* is a protrusion with a quadrilateral shape (parallelogram shape in the figure) in its plan view.

The recessed or protruded parts 41*ag* of FIG. 24 to FIG. 26 each satisfy the aforementioned condition (1) "in the predetermined direction A1, rows of the recessed or protruded parts 41*ag* arranged in a direction X1 perpendicular to the predetermined direction A1 are arranged at a regular interval", the condition (2) "in the predetermined direction A2, rows of the recessed or protruded parts 41*ag* arranged in a direction X2 perpendicular to the predetermined direction A2 are arranged at a regular interval", and the condition (3) "in the predetermined direction A3, rows of the recessed or protruded parts 41*ag* arranged in a direction X3 perpendicular to the predetermined direction A3 are arranged at a regular interval".

As described above, when the recessed or protruded parts 41*ag* satisfy the aforementioned conditions (1) to (3), the shapes of the recessed or protruded parts 41*ag* are not limited in particular. The recessed or protruded part 41*ag* may be a protrusion (protruded part) protruding in the thickness direction of the body 40, or a recessed part recessed in the thickness direction of the body 40. The recessed or protruded part 41*ag* may have circular, polygonal, or other shapes in its plan view. The size of the recessed or protruded part 41*ag* in its plan view may change as it leaves from the body 40. For example, the size of the recessed or protruded part 41*ag* in its plan view may become smaller gradually or in a stepwise manner as it leaves from the body 40. If the recessed or protruded parts 41*ag* can constitute the periodic structure, they may be any of a group of protrusions (protruded parts), a group of recessed parts, or a combination of protruded parts and recessed parts. The central axis of the recessed or protruded part 41*ag* may be a central axis of a protrusion of a central axis of a recess, for example. Further, when the aforementioned conditions (1) to (3) are satisfied, the intervals between the recessed or protruded parts 41*ag* in the predetermined direction A1, the predetermined direction A2, and the predetermined direction A3 may be different from each other. These points may similarly apply to the aforementioned recessed or protruded parts 41*a*, 41*aa*, 41*ab*, 41*ad*.

2.8 Other Variations

In one variation, the projection optical system 5 may be constituted by a plurality of optical elements. The plurality of optical elements may include a first compound lens where a negative meniscus lens and biconvex lens are combined, and a second compound lens where a positive meniscus lens and a negative meniscus lens are combined. The projection optical system 5 may not be limited if it can allow the image light ray L1 from the display element 2 to be incident on the light guide 4 with desired optical properties. Further, depending on cases, the projection optical system 5 may be omitted.

In the above embodiment, the projection optical system 5 and the in-coupling region 41 of the light guide 4 are arranged in a straight line. However, it is not always necessary that the projection optical system 5 and the in-coupling region 41 of the light guide 4 are arranged in a straight line. In other words, the optical path of the image light ray L1 from the projection optical system 5 to the in-coupling region 41 of the light guide 4 always need not be straight. For example, the image light ray L1 from the projection optical system 5 may be reflected by a reflective plate to be incident on the in-coupling region 41 of the light guide 4. In this arrangement, the optical path of the image light ray L1 from the projection optical system 5 to the in-coupling region 41 of the light guide 4 is not straight but an L-shape, for example.

In one variation, at least one of the in-coupling region 41 or the exit region 4 may include a volume holographic element (holographic diffraction grating) causing diffraction effect by periodic modulation of refractive indices. The volume holographic element has a structure where portions having different refractive indices are arranged alternately.

As apparent from the above embodiment, variation 4, and variation 5, in the optical system 3, at least one of the in-coupling region or the exit region may include a periodic structure constituted by recessed or protruded parts in relation to a thickness direction of a body which are arranged to have periodicity in three predetermined directions intersecting each other within a predetermined plane perpendicular to the thickness direction of the body. In the periodic structure, central axes of the recessed or protruded parts are inclined relative to the thickness direction of the body.

In one variation, the in-coupling region 41 and the exit region 42 may be different in a direction of the central axis C1 of the recessed or protruded part 41*a* of the periodic structure. For example, the central axis C1 of the recessed or protruded part 41*a* of the periodic structure of the exit region 42 may be inclined relative to the thickness direction T of the body 40 in a plane including the first branch direction D1 and the thickness direction T of the body 40. This enables an increase in an amount of light diffracted in the first branch direction D1 and results in improvement of the use efficiency of the image light ray L1 from the display element 2. Note that, it is not always necessary that all of the recessed or protruded parts 41 of the periodic structure of the exit region 42 have the central axes C1 inclined relative to the thickness direction T of the body 40 in the plane including the first branch direction D1 and the thickness direction T of the body 40. For example, the central axis C1 of the recessed or protruded part 41*a* of the periodic structure of the exit region 42 may be inclined relative to the thickness direction T of the body 40 in a plane including the second branch direction D2 and the thickness direction T of the body 40. This enables an increase in an amount of light diffracted in the second branch direction D2 and results in improvement of the use efficiency of the image light ray L1 from the display element 2. Note that, it is not always necessary that all of the recessed or protruded parts 41 of the periodic structure of the exit region 42 have the central axes C1 inclined relative to the thickness direction T of the body 40 in the plane including the second branch direction D2 and the thickness direction T of the body 40. For example, the central axis C1 of the recessed or protruded part 41*a* of the periodic structure of the exit region 42 may be inclined relative to the thickness direction T of the body 40 in a plane including the third branch direction D3 and the thickness direction T of the body 40. This enables an increase in an amount of light diffracted in the third branch direction D3 and results in improvement of the use efficiency of the image light ray L1 from the display element 2. Note that, it is not always necessary that all of the recessed or protruded parts 41 of the periodic structure of the exit region 42 have the central axes C1 inclined relative to the thickness direction T of the body 40 in the plane including the third branch direction D3 and the thickness direction T of the body 40. Further, the periodic structure of the exit region 42 may include the recessed or protruded parts 41*a* which are different in an inclination direction of the central axis C1.

For example, the recessed or protruded parts 41*a* of the periodic structure of the exit region 42 may include the recessed or protruded parts 41*a* different in a direction of the central axis C1 in the predetermined plane perpendicular to the thickness direction T of the body 40. The direction of the central axis C1 of the recessed or protruded part 41*a* may be appropriately set depending on the location of the recessed or protruded part 41*a* in the exit region 42 to enable uniform spread of the image light ray L1 from the in-coupling region 41 within the body 40 uniformly.

In one variation, the periodic structure of the exit region 42 may include a part having a diffraction efficiency toward the field of view region 6 which becomes greater as further from the in-coupling region 41. This configuration enables improvement of uniformity of light intensity distribution at the field of view region 6. Since the intensity of the image light rays L2 becomes larger as closer to the in-coupling region 41, the diffraction efficiency toward the field of view region 6 is made greater as further from the in-coupling region 41 to decrease light intensity at a location closer to the in-coupling region 41 and increase light intensity at a location further from the in-coupling region 41. By doing so, it is possible to uniform light intensity distribution at the field of view region 6. Examples of how to adjust the diffraction efficiency into a direction toward the field of view region 6 may include adjustment of heights of the recessed or protruded parts 41*a*.

In one variation, in the periodic structure of the exit region 42, the inclined angles of the recessed or protruded parts 41*a* relative to the thickness direction T of the body 40 may become smaller as he recessed or protruded parts 41*a* becomes further from the in-coupling region 41. This configuration enables improvement of uniformity of light intensity distribution at the field of view region 6. Since the intensity of the image light rays L2 becomes larger as closer to the in-coupling region 41, the inclined angles are made to be smaller as further from the in-coupling region 41, for example, to decrease light intensity at a location closer to the in-coupling region 41 and increase light intensity at a location further from the in-coupling region 41. By doing so, it is possible to uniform light intensity distribution at the field of view region 6.

In the above embodiment, the three predetermined directions A1, A2, A3 are, not limited thereto, directions not perpendicular to each other but intersecting each other in the predetermined plane perpendicular to the thickness direction T of the body 40. For example, at least two of the three predetermined directions A1, A2, A3 may be perpendicular to each other. The three predetermined directions A1, A2, A3 may be selected appropriately depending on usage of the optical system 3 or the like.

3. Aspects

As apparent from the above embodiment and variations, the present disclosure includes the following aspects. Hereinafter, reference signs in parenthesis are attached for the purpose of clearly showing correspondence with the embodiments only.

The first aspect is an optical system (3) including a light guide (4; 4D; 4E; 4F) for guiding an image light ray (L1) which is output from a display element (2) and forms an image, to a field of view region (6) of a user as a virtual image. The light guide (4; 4D; 4E; 4F) includes a body (40) having a plate shape, and an in-coupling region (41; 41A; 41B; 41C; 41D; 41F; 41G) and an exit region (42; 42D; 42F) which are formed in the body (40). The in-coupling region (41; 41A; 41B; 41C; 41D; 41F; 41G) allows the image light ray (L1) incident from the display element (2) to propagate within the body (40). The exit region (42; 42D; 42F) allows the image light ray propagating within the body (40) to emerge from the body (40) toward the field of view region (6). The in-coupling region (41; 41A; 41B; 41C; 41D; 41F; 41G) includes a periodic structure constituted by recessed or protruded parts (41*a*; 41*aa*; 41*ab*; 41*ad*; 41*ag*) in relation to a thickness direction (T) of the body (40) which are arranged to have periodicity in three predetermined directions (A1, A2, A3) intersecting each other within a predetermined plane perpendicular to the thickness direction (T) of the body (40). This aspect enables improvement of the use efficiency of the image light ray (L1) from the display element (2).

The second aspect is the optical system (3) according to the first aspect. In the second aspect, central axes (C1) of the recessed or protruded parts (41*a*; 41*aa*; 41*ab*; 41*ad*; 41*ag*) are inclined relative to the thickness direction (T) of the body (40). This aspect enables improvement of the use efficiency of the image light ray (L1) from the display element (2).

The third aspect is the optical system (3) according to the second aspect. In the third aspect, inclined angles (9) of the recessed or protruded parts (41*a*; 41*aa*; 41*ab*; 41*ad*; 41*ag*) relative to the thickness direction (T) of the body (40) are larger than 20 degrees but smaller than 65 degrees. This aspect enables improvement of the use efficiency of the image light ray (L1) from the display element (2).

The fourth aspect is the optical system (3) according to the first aspect. In the fourth aspect, the in-coupling region (41; 41A; 41B; 41C; 41F; 41G) divides the image light ray (L1) incident from the display element (2) into a plurality of the image light rays in a plurality of branch directions including first, second, and third branch directions (D1, D2, D3) respectively parallel to the three predetermined directions (A1, A2, A3) and allowing the plurality of image light rays to propagate within the body (40). This aspect enables improvement of the use efficiency of the image light ray (L1) from the display element (2).

The fifth aspect is the optical system (3) according to the fourth aspect. In the fifth aspect, the central axes (C1) of the recessed or protruded parts (41*a*; 41*aa*; 41*ab*; 41*ad*; 41*ag*) of the periodic structure of the in-coupling region (41; 41A; 41B; 41C; 41D; 41F; 41G) are inclined relative to the thickness direction (T) of the body (40) in each of a plane including the second branch direction (D2) and the thickness direction (T) of the body (40) and a plane including the third branch direction (D3) and the thickness direction (T) of the body (40). This aspect enables increasing amounts of light diffracted in the second branch direction (D2) and light diffracted in the third branch direction (D3) and therefore enables improvement of the use efficiency of the image light ray (L1) from the display element (2).

The sixth aspect is the optical system (3) according to the fifth aspect. In the sixth aspect, the in-coupling region (41; 41A; 41C; 41D; 41F; 41G) is on a surface (40*a*) on which the light image ray (L1) is incident, of the body (40). The central axes (C1) of the recessed or protruded parts (41*a*; 41*aa*; 41*ad*; 41*ag*) of the periodic structure of the in-coupling region (41; 41A; 41C; 41D; 41F; 41G) are: inclined in an opposite direction from the second branch direction (D2), relative to the direction of the surface (40*a*) on which the image light ray (L1) is incident, of the body (40), in the plane including the second branch direction (D2) and the thickness direction (T) of the body (40); and inclined in an opposite direction from the third branch direction (D3), relative to the direction of the surface (40*b*) on which the image light ray (L1) is incident, of the body (40), in the plane including the third branch direction (D3) and the thickness direction (T) of the body (40). This aspect enables increasing amounts of light diffracted in the second branch direction (D2) and light diffracted in the third branch direction (D3) and therefore enables improvement of the use efficiency of the image light ray (L1) from the display element (2).

The seventh aspect is the optical system (3) according to the fifth aspect. In the seventh aspect, the in-coupling region (41B; 41C) is on a surface (40*b*) from which the light image ray (L1) emerges, of the body (40). The central axes (C1) of the recessed or protruded parts (41*ab*) of the periodic structure of the in-coupling region (41B; 41C) are: inclined in the second branch direction (D2), relative to a direction of the surface (40*b*) from which the image light ray (L1) emerges, of the body (40), in the plane including the second branch direction (D2) and the thickness direction (T) of the body (40); and inclined in the third branch direction (D3), relative to a direction of the surface (40*b*) from which the image light ray (L1) emerges, of the body (40), in the plane including the third branch direction (D3) and the thickness direction (T) of the body (40). This aspect enables increasing amounts of light diffracted in the second branch direction (D2) and light diffracted in the third branch direction (D3) and therefore enables improvement of the use efficiency of the image light ray (L1) from the display element (2).

The eighth aspect is the optical system (3) according to any one of the fifth to seventh aspects. In the eighth aspect, a ratio of a size of the recessed or protruded parts (41*aa*) relative to a period of arrangement of the recessed or protruded parts (41*aa*) is larger in a direction perpendicular to the first branch direction (D1) within the predetermined plane than in a direction perpendicular to the second branch direction (D2) within the predetermined plane and a direction perpendicular to the third branch direction (D3) within the predetermined plane. This aspect enables improvement of an amount of light diffracted in a direction parallel to the first branch direction (D1), and thus enables improvement of the uniformity of amounts of light rays reaching the field of view region (6) of the user together with improvement of the use efficiency of the image light ray (L1) from the display element (2).

The ninth aspect is the optical system (3) according to any one of the fourth to eighth aspects. In the ninth aspect, when wave vectors in the first, second, and third branch directions (D1, D2, D3) of the periodic structure are denoted by k1, k2, and k3, respectively, and a maximum value of absolute values of the wave vectors in the first, second, and third branch directions (D1, D2, D3) is denoted by km, the wave vectors k1, k2, and k3 satisfy a relation of $|k1-k2+k3|<km/5$. This aspect enables improvement of the image quality.

The tenth aspect is the optical system (3) according to the ninth aspect. In the tenth aspect, the plurality of branch directions further include a fourth branch direction (D4). When a wave vector in the fourth branch direction (D4) of the periodic structure is denoted by k4, k4 is equal to $-k1$. This aspect enables expansion of the field of view region (6).

The eleventh aspect is the optical system (3) according to the ninth or tenth aspect. In the eleventh aspect, the absolute values of the wave vectors k1, k2, and k3 are identical to each other. This aspect enables arranging the pupils (L10) of the image light ray (L1) at a regular interval in the field of view region (6).

The twelfth aspect is the optical system (3) according to the ninth or tenth aspect. In the twelfth aspect, two of the absolute values of the wave vectors k1, k2, and k3 are identical to each other. This aspect enables adjusting locations of the pupils (L10) of the image light ray (L1) in the field of view region (6).

The thirteenth aspect is the optical system (3) according to the ninth or tenth aspect. In the thirteenth aspect, the absolute values of the wave vectors k1, k2, and k3 are different from each other. This aspect enables adjusting locations of the pupils (L10) of the image light ray (L1) in the field of view region (6).

The fourteenth aspect is the optical system (3) according to any one of the first to thirteenth aspects. In the fourteenth aspect, the exit region (42; 42D; 42F) includes the periodic structure. This aspect enables improvement of the use efficiency of the image light ray (L1) from the display element (2).

The fifteenth aspect is the optical system (3) according to the fourteenth aspect. In the fifteenth aspect, the exit region (42; 42D; 42F) divides the image light ray (L1) from the in-coupling region (41; 41A; 41B; 41C; 41D; 41F; 41G) into a plurality of the image light rays, allowing the plurality of image light rays to propagate within the body (40) in a plurality of branch directions including first, second, and third branch directions (D1, D2, D3) respectively parallel to the three predetermined directions (A1, A2, A3), and allows the plurality of image light rays (L1) propagating in the plurality of branch directions within the body (40) to emerge from the body (40) toward the field of view region (6). This aspect enables improvement of the use efficiency of the image light ray (L1) from the display element (2).

The sixteenth aspect is the optical system (3) according to the fifteenth aspect. In the sixteenth aspect, the central axes (C1) of the recessed or protruded parts (41*a*, 41*aa*, 41*ab*, 41*ad*, 41*ag*) of the periodic structure of the exit region (42; 42D; 42F) are inclined relative to the thickness direction (T) of the body (40) in a plane including the first branch direction (D1) and the thickness direction (T) of the body (40). This aspect enables increasing an amount of light diffracted in the first branch direction (D1) and therefore enables improvement of the use efficiency of the image light ray (L1) from the display element (2).

The seventeenth aspect is the optical system (3) according to the fifteenth aspect. In the seventeenth aspect, the central axes (C1) of the recessed or protruded parts (41*a*, 41*aa*, 41*ab*, 41*ad*, 41*ag*) of the periodic structure of the exit region (42; 42D; 42F) are inclined relative to the thickness direction (T) of the body (40) in a plane including the second branch direction (D2) and the thickness direction (T) of the body (40). This aspect enables increasing an amount of light diffracted in the second branch direction (D2) and therefore enables improvement of the use efficiency of the image light ray (L1) from the display element (2).

The eighteenth aspect is the optical system (3) according the fifteenth aspect. In the eighteenth aspect, the central axes (C1) of the recessed or protruded parts (41*a*, 41*aa*, 41*ab*, 41*ad*, 41*ag*) of the periodic structure of the exit region (42; 42D; 42F) are inclined relative to the thickness direction (T) of the body (40) in a plane including the third branch direction (D3) and the thickness direction (T) of the body (40). This aspect enables increasing an amount of light diffracted in the third branch direction (D3) and therefore enables improvement of the use efficiency of the image light ray (L1) from the display element (2).

The nineteenth aspect is the optical system (3) according to any one of the fourteenth to eighteenth aspects. In the nineteenth aspect, the periodic structure of the exit region (42; 42D; 42F) has a diffraction efficiency regarding a direction from the light guide (4; 4D; 4E; 4F) toward the field of view region (6), which becomes greater as further from the in-coupling region (41; 41A; 41B; 41C; 41D; 41F; 41G). This aspect enables improvement of uniformity of light intensity distribution at the field of view region (6).

The twentieth aspect is the optical system (3) according to any one of the fourteenth to nineteenth aspects. In the twentieth aspect, the periodic structure of the exit region (42; 42D) has inclined angles (θ) of the central axes (C1) of the recessed or protruded parts (41*a*) relative to thickness direction (T) of the body (40), which become smaller as further from the in-coupling region (41). This aspect enables improvement of uniformity of light intensity distribution at the field of view region (6).

The twenty-first aspect is the optical system (3) according to any one of the first to twentieth aspects. In the twenty-first aspect, the exit region (42; 42D; 42F) includes the periodic structure. The periodic structure of the in-coupling region (41; 41A; 41B; 41C; 41F; 41G) and the periodic structure of the exit region (42; 42D; 42F) have a same period in each of the three predetermined directions (A1, A2, A3). This aspect enables simplification of the structure of the light guide (4; 4F).

The twenty-second aspect is the optical system (3) according to any one of the first to twenty-first aspects. In the twenty-second aspect, the recessed or protruded parts (41*a*; 41*aa*; 41*ab*; 41*ad*; 41*ag*) are arranged within the predetermined plane in a hexagonal lattice. This aspect enables downsizing the light guide (4; 4D; 4E; 4F).

The twenty-third aspect is the optical system (3) according to any one of the first to twenty-second aspects. In the twenty-third aspect, the light guide (4; 4D; 4E; 4F) reproduces a pupil of the image right ray (L1) to expand the pupil by: dividing the image light ray (L1) entering the light guide (4; 4D; 4E) from the in-coupling region (41; 41A; 41B; 41C; 41D; 41F; 41G) into a plurality of mutually parallel image light rays (L1) in each of the three predetermined directions (A1, A2, A3) to be allowed to emerge toward the field of view region (6). This aspect enables improvement of the use efficiency of the image light ray (L1) from the display element (2).

The twenty-fourth aspect is the optical system (3) according to any one of the first to twenty-third aspects. In the twenty-fourth aspect, the optical system (3) further includes a projection optical system (5) allowing the image light ray (L1) to be incident on the in-coupling region (41; 41A; 41B; 41C; 41D; 41F; 41G) of the light guide (4; 4D; 4E; 4F) as a substantial collimate light ray. This aspect enables improvement of the use efficiency of the image light ray (L1) from the display element (2).

The twenty-fifth aspect is an image display device (1) including the optical system (3) according to any one of the first to twenty-fourth aspects and the display element (2). This aspect enables improvement of the use efficiency of the image light ray (L1) from the display element (2).

As above, as examples of techniques in the present disclosure, the embodiments are described. For this purpose, the attached drawings and the description are provided. Therefore, components described in the attached drawings and the description may include not only components necessary for solving problems but also components which are unnecessary for solving problems but useful for exemplifying the above techniques. Note that, such unnecessary components should not be considered as necessary just for the reason why such unnecessary components are described in the attached drawings and the description. Further, the embodiment described above is just prepared for exemplifying the techniques in the present disclosure and thus may be subjected to various modification, replacement, addition, omission, or the like within the scope defined by claims and those equivalent range.

INDUSTRIAL APPLICABILITY

The present disclosure is applicable to optical systems and image display devices. In more detail, the present disclosure is applicable to an optical system for guiding light from a display element to a field of view region of a user, and an image display device including this optical system.

REFERENCE SIGNS LIST

1 Image Display Device
2 Display Element
3 Optical System
4, 4D, 4E, 4F Light Guide
40, 40C, 40D Body
41, 41A, 41B, 41C, 41D, 41F, 41G In-coupling Region
41*a*, 41*aa*, 41*ab* 41*ad*, 41*ag* Recessed or Protruded Part
42, 42D, 42F Exit Region
42-1, 42-2, 42-3 Exit Region
5 Projection Optical System
6 Field of View Region
A1, A2, A3 Predetermined Direction
C1 Central Axis
θ Inclined Angle
D1 First Branch Direction (Branch Direction)
D2 Second Branch Direction (Branch Direction)
D3 Third Branch Direction (Branch Direction)
D4 Fourth Branch Direction (Branch Direction)
L1, L2, L3 Image Light Ray
L10 Pupil
T Thickness Direction

The invention claimed is:

1. An optical system comprising:
a light guide for guiding an image light ray which is output from a display element and forms an image, to a field of view region of a user as a virtual image,
wherein:
the light guide includes a body having a plate shape, and an in-coupling region and an exit region which are defined in the body;
the in-coupling region is configured to: (i) divide the image light ray incident from the display element into a plurality of image light rays in first, second, and third branch directions intersecting each other; and (ii) allow the plurality of image light rays to propagate within the body;
the exit region is configured to allow at least one of the plurality of image light rays propagating within the body to emerge from the body toward the field of view region;
the in-coupling region includes a periodic structure constituted by recessed or protruded parts in relation to a thickness direction of the body which are arranged to have periodicity in three predetermined directions parallel to the first, second, and third branch directions, respectively, within a predetermined plane perpendicular to the thickness direction of the body;

wave vectors in the first, second, and third branch directions are denoted by k1, k2, and k3, respectively:

a maximum value of absolute values |k1|, |k2|, |k3| of the wave vectors in the first, second, and third branch directions is denoted by |km|; and the wave vectors k1, k2, and k3 satisfy a relation of |k1−k2+k3|<|km|/5.

2. The optical system according to claim 1, wherein central axes of the recessed or protruded parts are inclined relative to the thickness direction of the body.

3. The optical system according to claim 2, wherein inclined angles of the recessed or protruded parts relative to the thickness direction of the body are larger than 20 degrees and smaller than 65 degrees.

4. The optical system according to claim 1, wherein central axes of the recessed or protruded parts are inclined relative to the thickness direction of the body in each of: (i) a plane including the second branch direction and the thickness direction of the body; and (ii) a plane including the third branch direction and the thickness direction of the body.

5. The optical system according to claim 4, wherein; the in-coupling region is on a surface of the body on which the image light ray is configured to be incident; and the central axes of the recessed or protruded parts are inclined:

in a direction opposite from the second branch direction, relative to a direction of the surface of the body on which the image light ray is configured to be incident, in the plane including the second branch direction and the thickness direction of the body; and in a direction opposite from the third branch direction, relative to the direction of the surface of the body on which the image light ray is configured to be incident, in the plane including the third branch direction and the thickness direction of the body.

6. The optical system according to claim 4, wherein:

the in-coupling region is on a surface of the body from which the at least one of the plurality of image light rays is configured to emerge; and the central axes of the recessed or protruded parts are inclined:

in the second branch direction, relative to a direction of the surface of the body from which the at least one of the plurality of image light rays is configured to emerge, in the plane including the second branch direction and the thickness direction of the body; and in the third branch direction, relative to the direction of the surface of the body from which the at least one of the plurality of image light rays is configured to emerge, in the plane including the third branch direction and the thickness direction of the body.

7. The optical system according to claim 4, wherein a ratio of a size of the recessed or protruded parts relative to a period of arrangement of the recessed or protruded parts is larger in a direction perpendicular to the first branch direction within the predetermined plane than in a direction perpendicular to the second branch direction within the predetermined plane and a direction perpendicular to the third branch direction within the predetermined plane.

8. The optical system according to claim 1, wherein: the in-coupling region is configured to divide the image light ray incident from the display element into the plurality of image light rays in the first, second, and third branch directions and a fourth branch direction; and a wave vector in the fourth branch direction is denoted by k4, and k4 is equal to −k1.

9. The optical system according to claim 1, wherein the absolute values |k1|, |k2|, |k3| of the wave vectors in the first, second, and third branch directions are identical to each other.

10. The optical system according to claim 1, wherein the absolute values |k1|, |k2|, |k3| of the wave vectors in the first, second, and third branch directions are different from each other.

11. The optical system according to claim 1, wherein: the exit region includes the periodic structure; and the periodic structure of the in-coupling region and the periodic structure of the exit region have a same period in each of the three predetermined directions.

12. The optical system according to claim 1, wherein the recessed or protruded parts are arranged within the predetermined plane in a hexagonal lattice.

13. The optical system according to claim 1, wherein the light guide is configured to reproduce a pupil of the image right ray to expand the pupil by: dividing the image light ray entering the light guide from the in-coupling region into a plurality of mutually parallel image light rays in each of the three predetermined directions to be allowed to emerge toward the field of view region.

14. The optical system according to claim 1, further comprising:

a projection optical system configured to allow the image light ray to be incident on the in-coupling region of the light guide as a collimate light ray.

15. An image display device comprising: the optical system according to claim 1; and the display element.

16. An optical system comprising:

a light guide for guiding an image light ray which is output from a display element and forms an image, to a field of view region of a user as a virtual image, wherein:

the light guide includes a body having a plate shape, and an in-coupling region and an exit region which are defined in the body;

the in-coupling region is configured to: (i) divide the image light ray incident from the display element into a plurality of image light rays in first, second, and third branch directions intersecting each other; and (ii) allow the plurality of image light rays to propagate within the body;

the exit region is configured to allow at least one of the plurality of image light rays propagating within the body to emerge from the body toward the field of view region;

the in-coupling region includes a periodic structure constituted by recessed or protruded parts in relation to a thickness direction of the body which are arranged to have periodicity in three predetermined directions parallel to the first, second, and third branch directions, respectively, within a predetermined plane perpendicular to the thickness direction of the body;

central axes of the recessed or protruded parts are inclined relative to the thickness direction of the body in each of: (i) a plane including the second branch direction and the thickness direction of the body; and (ii) a plane including the third branch direction and the thickness direction of the body; and a ratio of a size of the recessed or protruded parts relative to a period of arrangement of the recessed or protruded parts is larger in a direction perpendicular to the first branch direction within the predetermined plane than in a direction perpendicular to the second branch direction within the predetermined plane and a direction perpendicular to the third branch direction within the predetermined plane.

\* \* \* \* \*